United States Patent
Konno et al.

(10) Patent No.: US 9,557,828 B2
(45) Date of Patent: Jan. 31, 2017

(54) INPUT INFORMATION PROCESSING SYSTEM, INPUT INFORMATION PROCESSING METHOD, PROGRAM AND COMPUTER-READABLE RECORDING MEDIUM

(75) Inventors: Takuya Konno, Kanagawa (JP); Yoshikuni Shibata, Kanagawa (JP)

(73) Assignee: ZUKEN INC., Kanagawa (JP)

( * ) Notice: Subject to any disclaimer, the term of this patent is extended or adjusted under 35 U.S.C. 154(b) by 220 days.

(21) Appl. No.: 13/823,083

(22) PCT Filed: Jul. 26, 2011

(86) PCT No.: PCT/JP2011/066894
§ 371 (c)(1),
(2), (4) Date: Apr. 10, 2013

(87) PCT Pub. No.: WO2012/049899
PCT Pub. Date: Apr. 19, 2012

(65) Prior Publication Data
US 2013/0187856 A1    Jul. 25, 2013

(30) Foreign Application Priority Data
Oct. 15, 2010 (JP) ................................ 2010-232139

(51) Int. Cl.
*G06F 3/033* (2013.01)
*G06F 3/0481* (2013.01)
(Continued)

(52) U.S. Cl.
CPC ............... *G06F 3/033* (2013.01); *G06F 3/038* (2013.01); *G06F 3/03543* (2013.01);
(Continued)

(58) Field of Classification Search
CPC ... G06F 3/0485; G06F 3/04855; G06F 3/0482
See application file for complete search history.

(56) References Cited

U.S. PATENT DOCUMENTS 5,877,765 A * 3/1999 Dickman ............... G06F 3/0481
715/738
6,049,335 A * 4/2000 Iida ....................... G06F 3/0482
715/811

(Continued)

FOREIGN PATENT DOCUMENTS

DE    3933752 A1    7/1990
JP    2009525538 A    7/2009

OTHER PUBLICATIONS

Search Report issued on Aug. 3, 2016 in corresponding EP patent application No. 11832341 (6 pgs.).

*Primary Examiner* — Chad Dicke
(74) *Attorney, Agent, or Firm* — Muncy, Geissler, Olds & Lowe, P.C.

(57) ABSTRACT

An input information processing system, which is configured so as to enable an operator to efficiently conduct work without interruption, and processes input information that has been inputted using an input device, is configured so as to comprise: a display means for displaying data to be processed on a display screen; a first input device for inputting first input information; a second input device for inputting second input information; an acquisition means for acquiring a predetermined position in the data to be processed, which is displayed on the display screen of the display means, on the basis of the first input information inputted using the first input device; and control means for clearly showing the predetermined position in the data to be processed which was acquired by the acquisition means on the data to be processed displayed on the display screen of the display means, and for controlling the data to be processed which is displayed on the display screen of the display means on the basis of the second input information inputted using the second input device.

20 Claims, 20 Drawing Sheets

(51) Int. Cl.
  *G06F 3/0488* (2013.01)
  *G06F 3/038* (2013.01)
  *G06F 3/0354* (2013.01)

(52) U.S. Cl.
  CPC ........ *G06F 3/03547* (2013.01); *G06F 3/0481* (2013.01); *G06F 3/0488* (2013.01); *G06F 2203/0381* (2013.01); *G06F 2203/04808* (2013.01)

(56) References Cited

U.S. PATENT DOCUMENTS

| | | |
|---|---|---|
| 7,561,146 B1 | 7/2009 | Hotelling |
| 8,448,083 B1 * | 5/2013 | Migos et al. ................. 715/781 |
| 2002/0109671 A1 * | 8/2002 | Kawasome ............ G06F 3/023 345/156 |
| 2004/0080622 A1 | 4/2004 | Gombert |
| 2004/0210852 A1 * | 10/2004 | Balakrishnan .......... G06F 3/038 715/856 |
| 2007/0103435 A1 | 5/2007 | Kawasome |
| 2007/0164995 A1 | 7/2007 | Pascucci |
| 2009/0213081 A1 | 8/2009 | Case, Jr. |
| 2010/0245278 A1 * | 9/2010 | Hosoda ............... G06F 3/04883 345/173 |
| 2011/0080341 A1 * | 4/2011 | Helmes ............... G06F 3/03543 345/163 |

\* cited by examiner

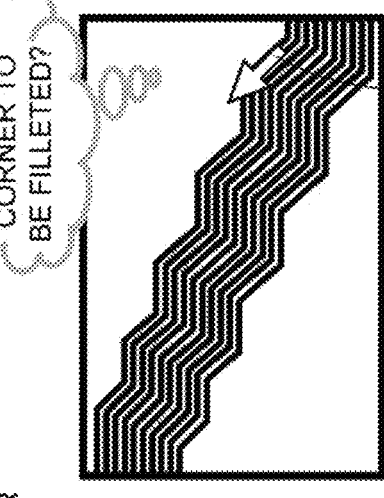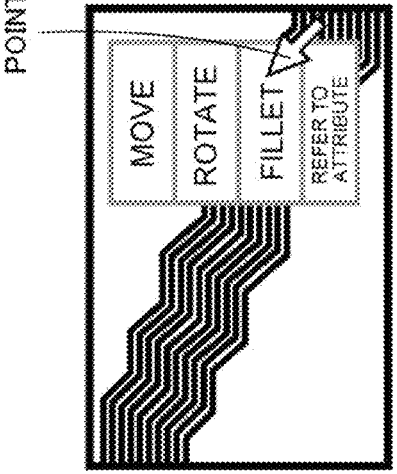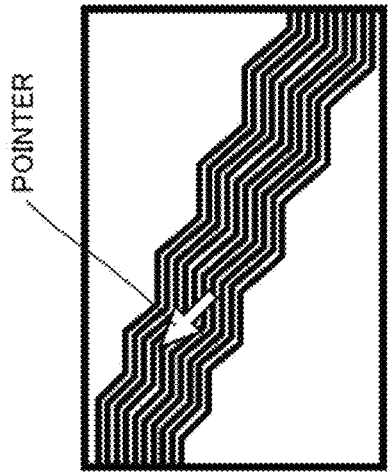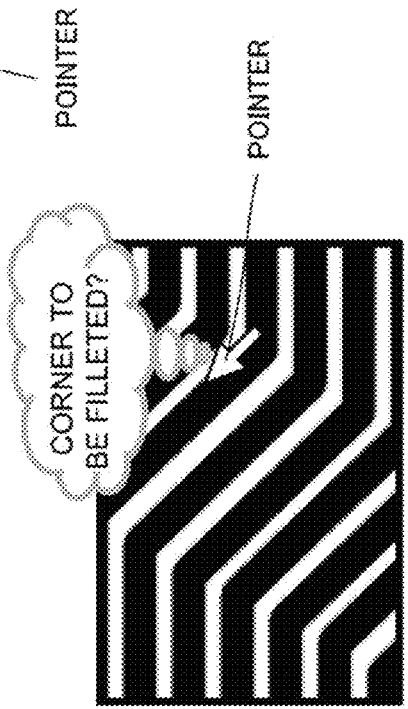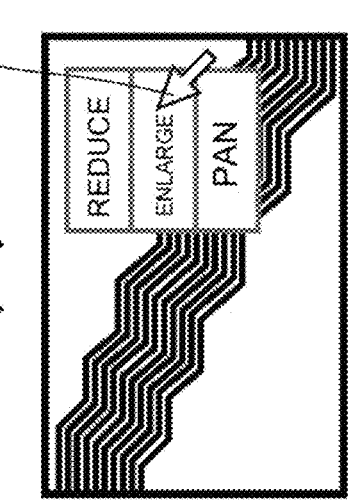

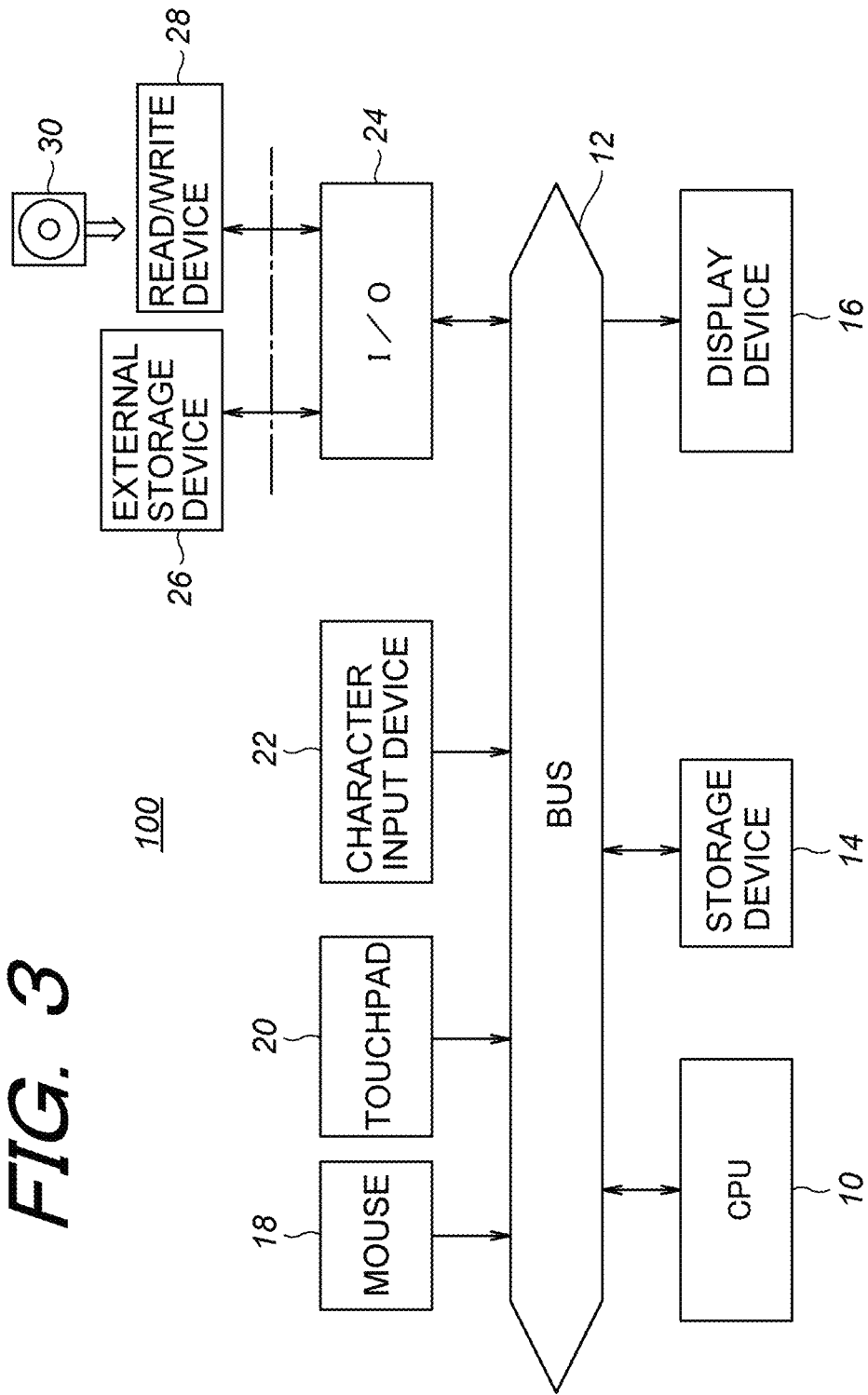

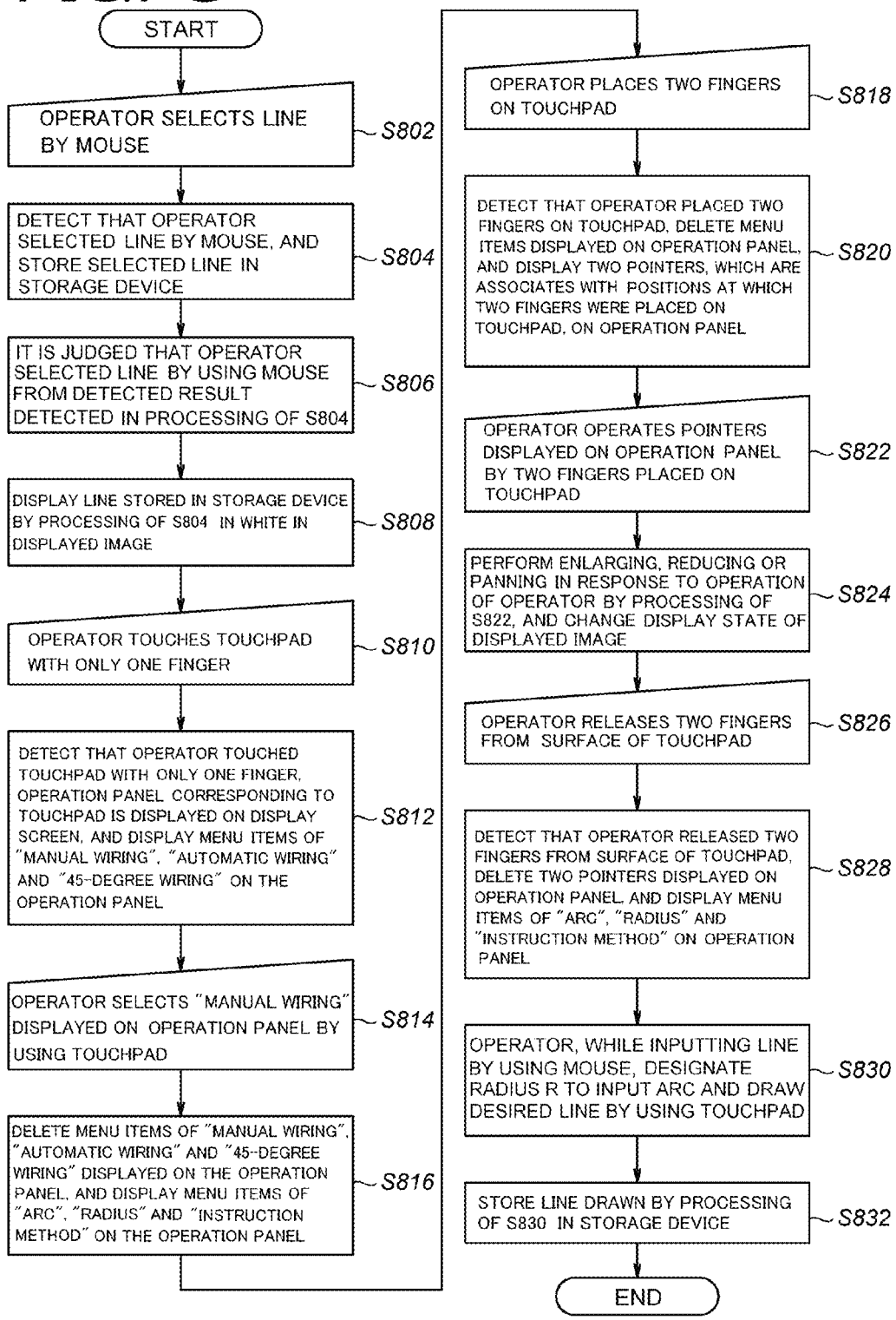

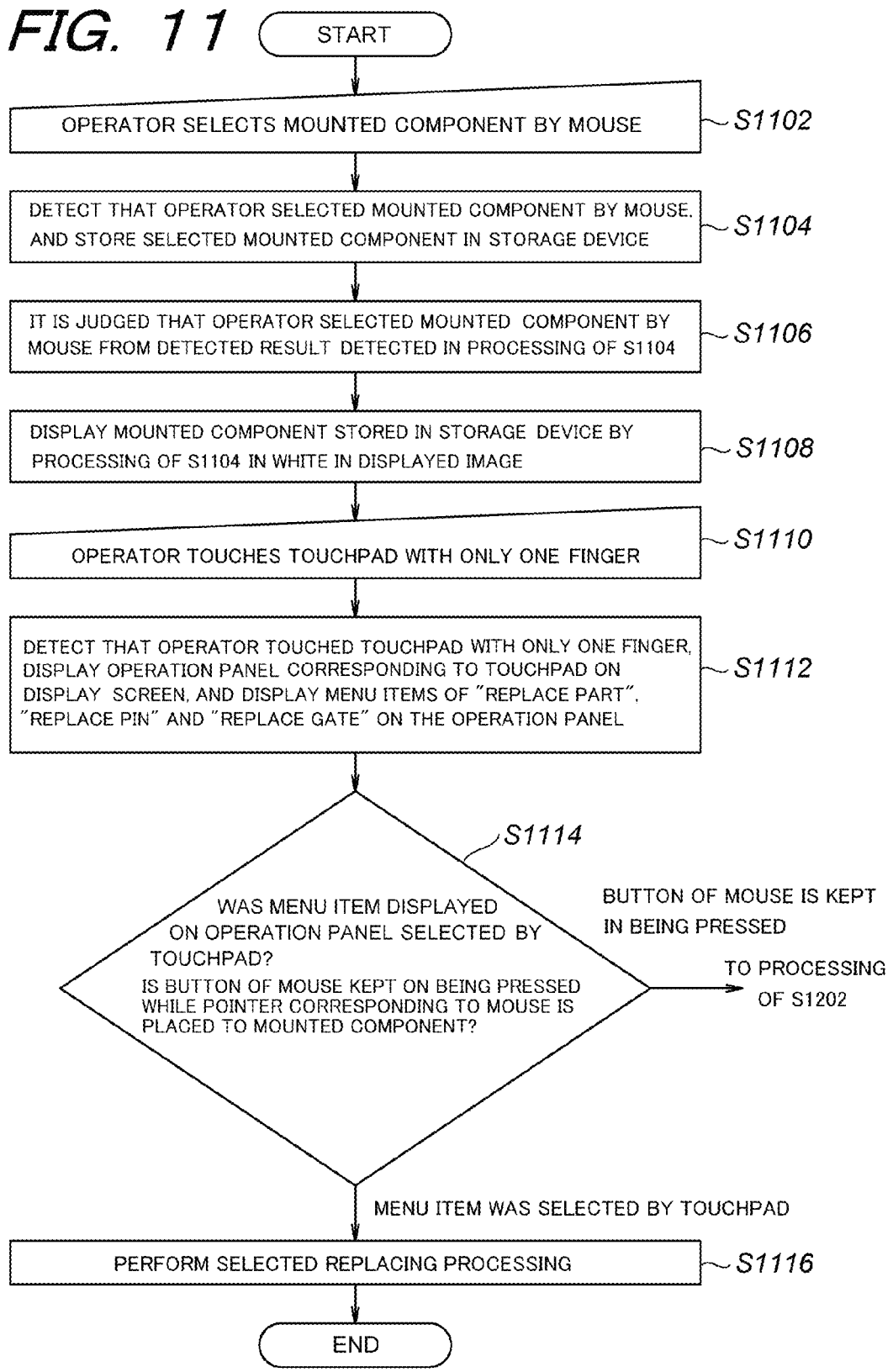

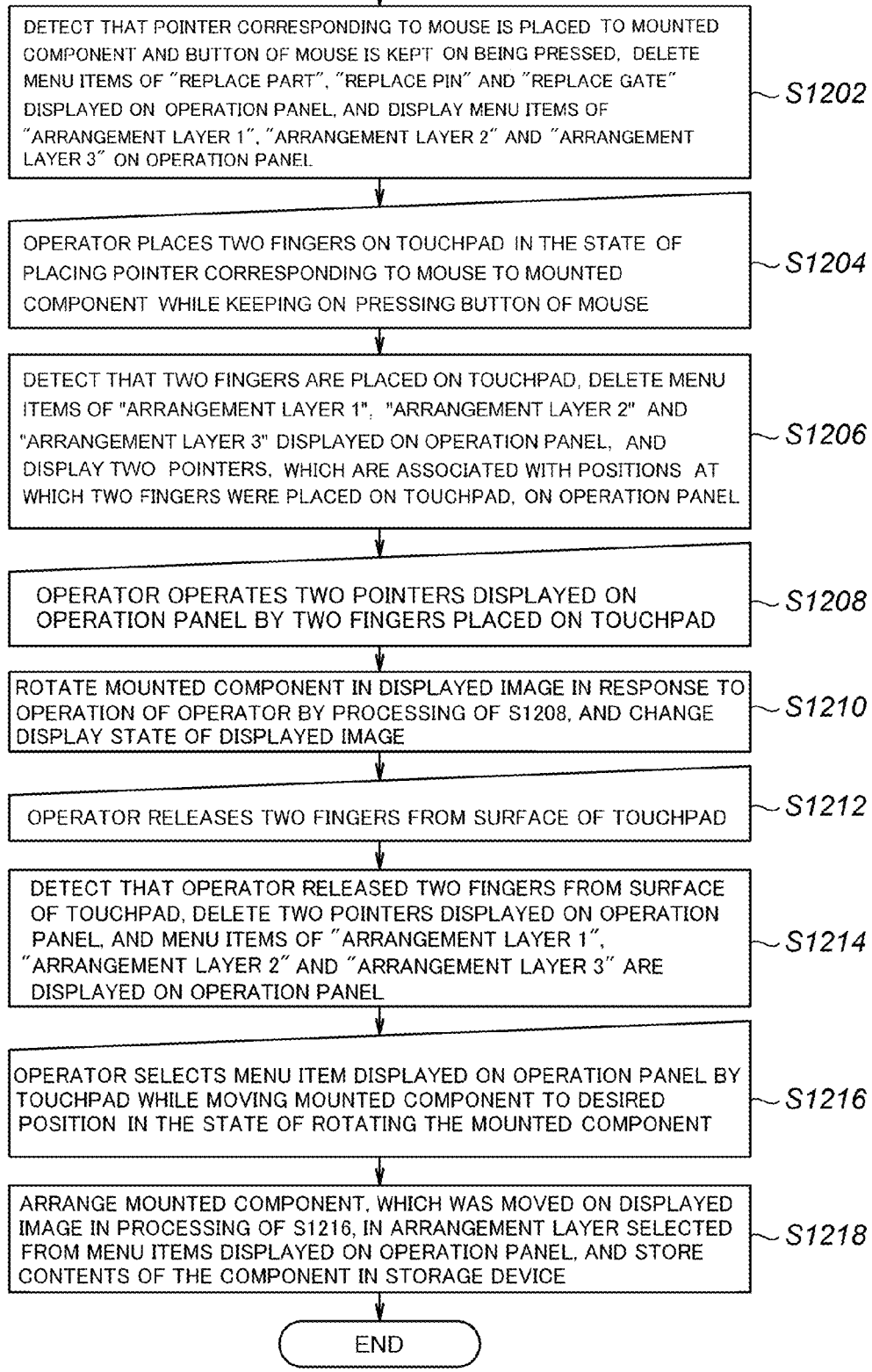

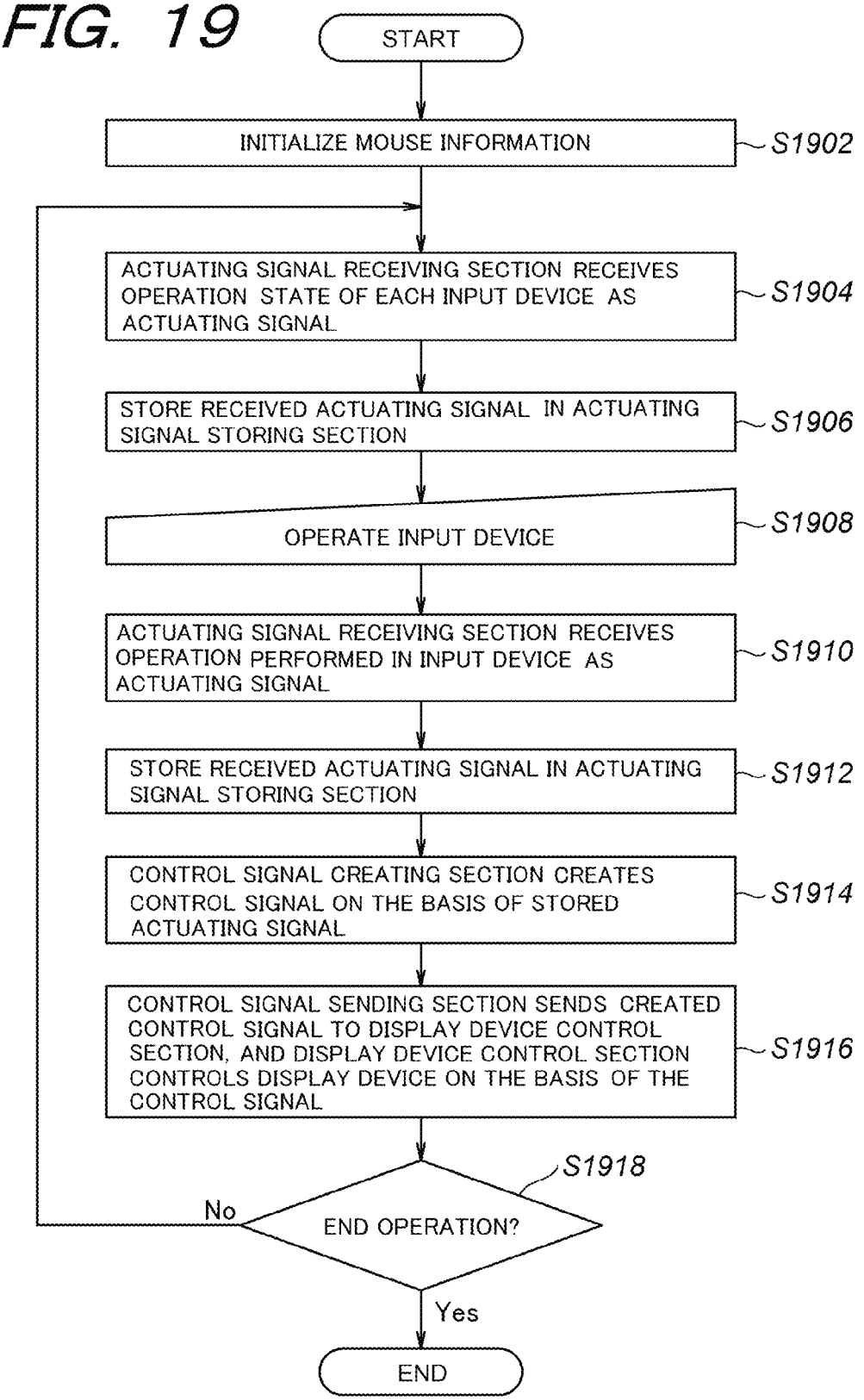

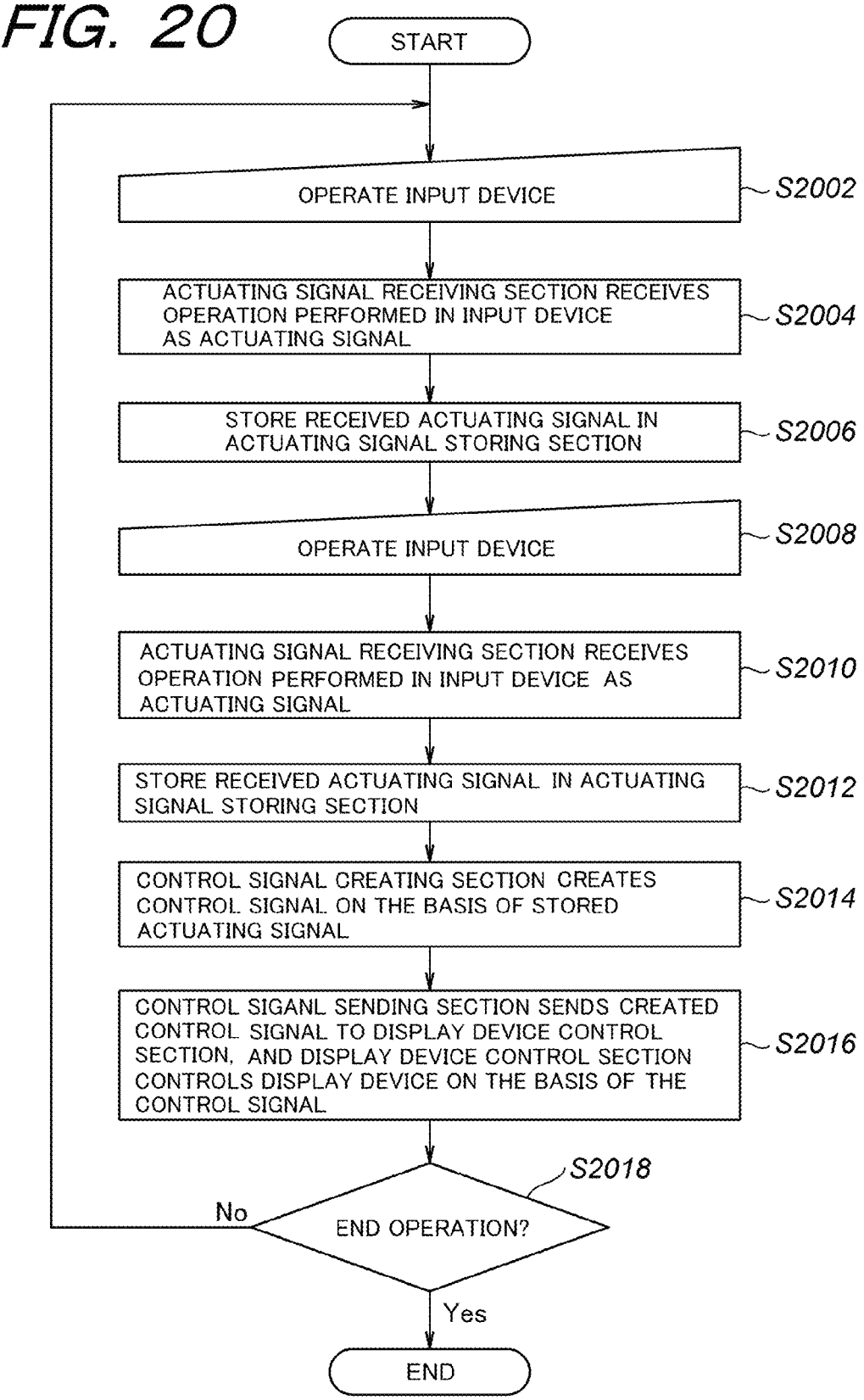

INPUT INFORMATION PROCESSING SYSTEM, INPUT INFORMATION PROCESSING METHOD, PROGRAM AND COMPUTER-READABLE RECORDING MEDIUM

TECHNIQUE FIELD

The present invention relates to an input information processing system, an input information processing method, a program and a computer-readable recording medium, more particularly to an input information processing system that processes input information from an input device, an input information processing method, a program and a computer-readable recording medium.

BACKGROUND TECHNOLOGY

Conventionally, a pointing device has been known as an input device in a computer system.

Such a pointing device is operated to move a pointer displayed on a display screen to select a menu displayed on the display screen or designate an object displayed on the display screen, for example.

Normally, only one pointing device is connected to one computer system, and work is performed in a computer system by using the connected pointing device.

In this occasion, only one pointer corresponding to one pointing device is displayed on the display screen, by using pointing device the work is performed while operating the one pointer to move.

Therefore, as it will be explained below, there was a case where efficient work could not be performed in a work using the pointing device.

For example, in an electrical design field or the like, electrical design is generally performed by using an electrical design CAD system being a CAD system that is a designing system supported by a computer system.

In the work of electrical design, when an operator performs filleting (fillet) to a desired line bending part out of a plurality of lines that constitute a wiring harness, the operator naturally performs a work of confirming a line bending part being a target to be filleted previously on the display screen. This work can be done easier if a pointing device is operated to move the pointer to find a bending part being a target to be filleted while the pointer is used as a mark (refer to FIG. 1(a)).

The operator performs processing in a procedure below. The operator, after confirming the line bending part being the target to be filleted on the display screen as described above, performs a predetermined operation to display a menu window on the display screen, moves the pointer to "fillet" which is one of menu items displayed in the menu window to select it by using the pointing device (refer to FIG. 1(b)), after that, moves the pointer to a previously found line bending part being the target to be filleted to select it by using the pointing device, and inputs a numerical value of radius R in filleting by a character input device or the like.

At this point, in selecting the menu item "fillet" displayed on the menu window, the pointer that was used as a mark of the work of confirming the line bending part being the target to be filleted previously on the display screen is moved to the position of "fillet" displayed in the menu window.

Consequently, the operator has a difficulty in immediately determining which bending part of which line of the wiring harness should be filleted (refer to FIG. 1(c)), and the operator has to find a lost fillet line bending part again, by which a design work is interrupted while he/she tries to find the line bending part to be filleted.

Further, in the case of designating a line bending part being the target to be filleted by enlarging a displayed image, the displayed image on the display screen is enlarged by performing a predetermined operation to display the menu window on the display screen and moving the pointer to "enlarge" which is one of menu items displayed in the menu window to select it (refer to FIG. 1(d)), and the operator finds the line bending part being the target to be filleted referring to the enlarged displayed image.

At this point, since the displayed image on the display screen after being enlarged was enlarged by using the central coordinate of the displayed image before being enlarged as the center, there is a case where the line bending part being the target to be filleted is not displayed in the displayed image after being enlarged.

In such a case, the operator has to find the line bending part being the target to be filleted by scrolling the displayed image, or the like, the operator has a difficulty in immediately determining which bending part of which line in the wiring harness should be filleted (refer to FIG. 1(e)), and the operator has to find a lost fillet line bending part again, by which a design work is interrupted while he/she tries to find the line bending part to be filleted.

Furthermore, in a case where long time was taken for the work of finding the fillet bending part or the like in the above-described situation, there is a case where the operator forges even a numerical value of the radius R to be inputted to the character input device. In this case, the operator needed to review data being edited to calculate a numerical value of the radius R again.

It is to be noted that the processing of filleting the line bending part in performing the above-described electrical design is merely an example of a design work in electrical design, and in the case of performing electrical design by using the pointer that is operated to be moved by the pointing device, reduction of various work efficiency similar to what was described above was caused.

Particularly, in design environment using a pointer that is repeatedly operated to be moved by the pointing device for hundreds or thousands of times, time of the above-described work interruption is accumulated in proportion to the number of operations, so that work efficiency was significantly reduced.

Further, the pointing device connected to a computer is operated by the dominant hand of the operator, dependence on the dominant hand of the operator is extremely high when conducting a work, and the operator could not use both hands efficiently.

Specifically, a case where the operator performs filleting to a desired line bending part by using a mouse as the pointing device is considered, for example. The operator selects an item "fillet" from a menu displayed in the menu window by the mouse operated by his or her dominant hand (refer to FIG. 2(a)), selects a line bending part to be filleted by the mouse operated by his or her dominant hand (refer to FIG. 2(b)), and inputs a numerical value of the radius R by a character input device operated by fingers of his or her dominant hand (refer to FIG. 2(c)).

Specifically, in the above-described work, operations are performed by the dominant hand of the operator, and the non-dominant hand of the operator is not used.

In short, in operating a computer by using the pointing device, characters are inputted by using both hands on the character input device when inputting characters, but only the dominant hand of the operator is used in many other operations.

In the case of operating a computer by using the pointing device in this manner, operations highly dependent on the dominant hand of the operator are generally used, but if an unused hand, that is, the non-dominant hand can be efficiently used, a more efficient work can be performed in such works using a computer.

As explained above, works of the operator using the pointing device by a conventional technique have a problem that work interruption or the like of the operator occurs and an efficient work cannot be performed, and proposal of an input information processing technique which enables the operator to efficiently perform work without interruption has been desired.

It is to be noted that prior art that the present applicant knows at the point of filing a patent is not an invention known to the public through publication, so there is no prior art document information to be described in the present specification.

SUMMARY OF THE INVENTION

Problems to be Solved by the Invention

The present invention has been created in view of the above-described request that a conventional technique has and it is an object of the invention to provide an input information processing system, an input information processing method, a program and a computer-readable recording medium, in which an operator is enabled to efficiently perform work without interruption.

Means for Solving the Problems

To achieve the above-described object, the present invention is an input information processing system that processes input information inputted by an input device, in which the processing device has: display means for displaying data to be processed on a display screen; a first input device that inputs first input information; a second input device that inputs second input information; acquisition means for acquiring a predetermined position in the data to be processed displayed on the display screen of the display means on the basis of the first input information inputted by the first input device; first control means for clearly showing the predetermined position in the data to be processed, which was acquired by the acquisition means, on the data to be processed displayed on the display screen of the display means and for controlling the data to be processed displayed on the display screen of the display means on the basis of the second input information inputted by the second input device.

Further, the present invention is the above-described invention, in which the acquisition means acquires a coordinate value of a pointer corresponding to the first input device in the data to be processed displayed on the display screen of the display means, and the first control means, in the state where the pointer corresponding to the first input device is displayed at a position indicated by the coordinate value, controls the data to be processed displayed on the display screen of the display means on the basis of the second input information inputted by the second input device.

Further, the present invention is the above-described invention, in which the acquisition means acquires a coordinate value of the predetermined object selected by the first input device in the data to be processed displayed on the display screen of the display means, and the first control means, in the state where the predetermined object is displayed at a position indicated by the coordinate value, controls the data to be processed displayed on the display screen of the display means on the basis of the second input information inputted by the second input device.

Further, the present invention is the above-described invention, in which as the acquisition means acquires the coordinate value of the pointer corresponding to the first input device in the data to be processed displayed on the display screen of the display means, the first control means, in the state where the pointer corresponding to the first input device is displayed at a position indicated by the coordinate value, controls the data to be processed displayed on the display screen of the display means on the basis of the second input information inputted by the second input device, and as the acquisition means acquires the coordinate value of the predetermined object selected by the first input device in the data to be processed displayed on the display screen of the display means, the first control means, in the state where the predetermined object is displayed at a position indicated by the coordinate value, controls the data to be processed displayed on the display screen of the display means on the basis of the second input information inputted by the second input device.

Further, the present invention is the above-described invention, in which a parallel operation of the first input device and the second input device is enabled in operating the first input device by one hand of the operator and operating the second input device by the other hand of the operator.

Further, the present invention is the above-described invention, which has: detecting means for detecting an operating state of the first input device and the second input device; determining means for determining second input information that can be inputted by the second input device in response to the operating state of the first input device and the second input device detected by the detecting means; and input information display means for displaying the second input information determined by the determining means in a predetermined region displayed on the display screen of the display means.

Further, the present invention is the above-described invention, in which in the case where the detecting means detected that a predetermined object was selected by the first input device, the determining means determines the second input information indicating the most suitable processing content for the predetermined object and the input information display means displays the determined second input information in the predetermined region, and in the case where the detecting means detected that a predetermined object was not selected by the first input device, the determining means determines the second input information that is widely used in the state where a predetermined object is not selected and the input information display means displays the determined second input information in the predetermined region.

Further, the present invention is the above-described invention, in which a pointer corresponding to the first input device is displayed on the display screen of the display means, and a pointer corresponding to the second input device is displayed in the predetermined region.

Further, the present invention is the above-described invention, in which the first input device is a device capable of moving a corresponding pointer through operation by the operator and capable of selecting or cancelling the selection of an arbitrary object and an arbitrary region by using the pointer, and the second input device is a device capable of detecting a finger action of the operator on a plane or in a space, moving a corresponding pointer by the finger action, and capable of selecting or cancelling the selection of an arbitrary object and an arbitrary region by using the pointer.

Further, the present invention is the above-described invention, in which in the case where the detecting means detected that an operation by the fingers of the operator was performed by the second input device, the determining means determines the second input information that can be inputted by the second, input device in response to the number of fingers of the operator operated by the second input device, and the input information display means displays the determined second input information in the predetermined region.

Further, the present invention is the above-described invention, in which the first input device is a mouse, and the second input device is a touchpad.

Further, the present invention is the above-described invention, in which in the case where a predetermined object was not selected by the mouse and the detecting means detected that a gap between the two fingers was widened/narrowed in the state where the two fingers contacted on the touchpad, the acquisition means acquires a coordinate value of a pointer corresponding to the mouse in the data to be processed which is displayed on the display screen of the display means, and the first control means displays the data to be processed in an enlarged/reduced manner by using a position indicated by the coordinate value as the center, in the case where a predetermined object was selected by the mouse and the detecting means detected that a gap between the two fingers was widened/narrowed in the state where the two fingers contacted on the touchpad, the acquisition means acquires a coordinate value of the predetermined object selected by the mouse in the data to be processed which is displayed on the display screen of the display means, and the first control means displays the data to be processed in an enlarged/reduced manner by using a position indicated by the coordinate value as the center, and in the case where a predetermined object was selected by the mouse and the detecting means detected that, in the state where two fingers contacted on the touchpad, one finger out of the two fingers was fixed and the other finger was rotated by using the one finger as the center, the first control means rotates the predetermined object selected by the mouse in the same direction as the rotation.

Further, the present invention is an input information processing method in which input information inputted by an input device is processed, the method has: an acquisition process in which a predetermined position in the data to be processed displayed on the display screen of the display means is acquired on the basis of the first input information inputted by the first input device; and a first control process in which a predetermined position in the data to be processed acquired in the acquisition process is clearly shown on the data to be processed displayed on the display screen of the display means and the data to be processed displayed on the display screen of the display means is controlled on the basis of the second input information inputted by the second input device.

Further, the present invention is the above-described invention, in which in the acquisition process, a coordinate value of the pointer corresponding to the first input device in the data to be processed displayed on the display screen of the display means is acquired, and in the first control process, the data to be processed displayed on the display screen of the display means is controlled on the basis of the second input information inputted by the second input device in the state where the pointer corresponding to the first input device is displayed at a position indicated by the coordinate value.

Further, the present invention is the above-described invention, in which in the acquisition process, a coordinate value of a predetermined object selected by the first input device in the data to be processed displayed on the display screen of the display means is acquired, and in the first control process, the data to be processed displayed on the display screen of the display means is controlled on the basis of the second input information inputted by the second input device in the state where the predetermined object is displayed at a position indicated by the coordinate value.

Further, the present invention is the above-described invention, in which as a coordinate value of the pointer corresponding to the first input device in the data to be processed displayed on the display screen of the display means is acquired in the acquisition process, the data to be processed displayed on the display screen of the display means is controlled on the basis of the second input information inputted by the second input device in the first control process in the state where the pointer corresponding to the first input device is displayed at a position indicated by the coordinate value, and as a coordinate value of the predetermined object selected by the first input device in the data to be processed displayed on the display screen of the display means is acquired in the acquisition process, the data to be processed displayed on the display screen of the display means is controlled on the basis of the second input information inputted by the second input device in the first control process in the state where the predetermined object is displayed at a position indicated by the coordinate value.

Further, the present invention is the above-described invention, in which a parallel operation of the first input device and the second input device is enabled in operating the first input device by one of operator's hands and operating the second input device by the other hand of the operator.

Further, the present invention is the above-described invention, which has: a detection process in which an operating state of the first input device and the second input device is detected; a determination process in which the second input information that can be inputted by the second input device is determined in response to the operating state of the first input device and the second input device detected in the detection process; and an input information display process in which the second input information determined in the determination process is displayed in a predetermined region displayed on the display screen of the display means.

Further, the present invention is the above-described invention, in which in the case where the fact that a predetermined object was selected by the first input device was detected in the detection process, the second input information indicating the most suitable processing content is determined for the predetermined object in the determination process, and the determined second input information is displayed in the predetermined region in the input information display process, and in the case where the fact that a predetermined object was not selected by the first input device was detected in the detection process, the second input information widely used in the state where a predetermined object is not selected is determined in the determination process, and the determined second input information is displayed in the predetermined region in the input information display process.

Further, the present invention is the above-described invention, in which a pointer corresponding to the first input device is displayed on the display screen of the display means, and a pointer corresponding to the second input device is displayed in the predetermined region.

Further, the present invention is the above-described invention, in which the first input device is a device capable of moving a corresponding pointer through operation by the operator and capable of selecting or cancelling the selection of an arbitrary object and an arbitrary region by using the pointer, and the second input device is a device capable of detecting a finger action of the operator on a plane or in a space, moving a corresponding pointer by the finger action and capable of selecting or cancelling the selection of an arbitrary object and an arbitrary region by using the pointer.

Further, the present invention is the above-described invention, in which in the case where the fact that an operation by the fingers of the operator was performed by the second input device was detected in the detection process, the second input information that can be inputted by the second input device is determined in the determination process in response to the number of fingers of the operator operated by the second input device and the determined second input information is displayed in the predetermined region in the input information display process.

Further, the present invention is the above-described invention, in which the first input device is a mouse, and the second input device is a touchpad.

Further, the present invention is the above-described invention, in which in the case where a predetermined object was not selected by the mouse and the fact that a gap between the two fingers was widened/narrowed in the state where the two fingers contacted on the touchpad was detected in the detection process, a coordinate value of the pointer corresponding to the mouse in the data to be processed which is displayed on the display screen of the display means is acquired in the acquisition process, and the data to be processed is displayed in an enlarged/reduced manner by using a position indicated by the coordinate value as the center in the first control process, in the case where a predetermined object was selected by the mouse and the fact that a gap between the two fingers was widened/narrowed in the state where the two fingers contacted on the touchpad was detected in the detection process, a coordinate value of the predetermined object selected by the mouse in the data to be processed which is displayed on the display screen of the display means is acquired in the acquisition process, and the data to be processed is displayed in an enlarged/reduced manner by using a position indicated by the coordinate value as the center in the first control process, and in the case where a predetermined object was selected by the mouse and the fact that, in the state where the two fingers contacted on the touchpad one finger out of the two fingers was fixed and the other finger was rotated by using the one finger as the center was detected in the detection process, a predetermined object selected by the mouse is rotated in the same direction as the rotation, in the first control process.

Further, the present invention is a program for allowing a computer to function as the input information processing system according to the above-described invention.

Further, the present invention is a program for allowing a computer to execute the input information processing method according to the above-described invention.

Further, the present invention is a computer-readable recording medium in which the program according to the above-described invention is recorded.

Effect of the Invention

Since the present invention is constituted as explained above, it exerts an excellent effect that enables an operator to efficiently perform work without interruption.

BRIEF DESCRIPTION OF THE DRAWINGS

FIG. 1(a) (b) (c) (d) (e) are explanatory views for showing a display screen in the middle of a design processing performed by an electrical design CAD system by a conventional technique.

FIG. 3 is a block constitution view for showing a hardware configuration of an embodiment an electrical design CAD system equipped with an input information processing system according to the present invention.

FIG. 7 is an explanatory view for showing a work state of the operator in the case where the dominant hand of the operator is a right hand and the non-dominant hand is a left hand. Further.

FIG. 8 is a flowchart for showing a processing routine of a processing in which a line is selected as an object and manual wiring is performed as a processing of executing a menu showing the most suitable processing content for a selected object.

FIG. 9 is an explanatory view for showing a work state of the operator in the case where the dominant hand of the operator is a right hand and the non-dominant hand is a left hand.

FIG. 11 is a flowchart for showing a processing routine of a processing in which a mounted component is selected as an object and gate is replaced as a processing of executing a menu showing the most suitable processing content for a selected object.

FIG. 12 is a flowchart for showing a processing routine of a processing in which the mounted component is selected as an object and arranging/moving is performed as a processing of executing a menu showing the most suitable processing content for a selected object.

FIG. 13 is an explanatory view for showing a work state of the operator in the case where the dominant hand of the operator is a right hand and the non-dominant hand is a left hand.

FIG. 14 is an explanatory view for showing a work state of the operator in the case where the dominant hand of the operator is right hand and the non-dominant hand is left hand.

FIG. 19 is a flowchart for showing a processing routine of a processing focused on an enlarging/reducing display processing of a displayed image in the electrical design CAD system equipped with the input information processing system according to the present invention.

FIG. 20 is a flowchart for showing a processing routine of a processing when selecting a specific object in the electrical design CAD system equipped with the input information processing system according to the present invention.

MODES FOR IMPLEMENTING THE INVENTION

Figure 2C:
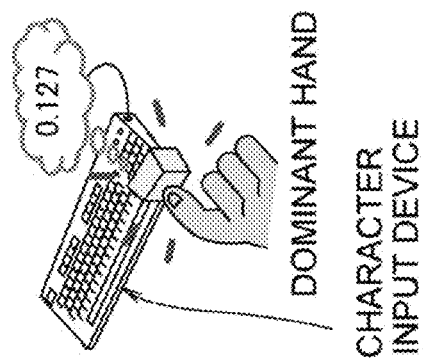
FIG. 2(a) (b) (c) are explanatory views for showing an input operation using a device of an operator in the electrical design CAD system by a conventional technique.
Figure 2B:
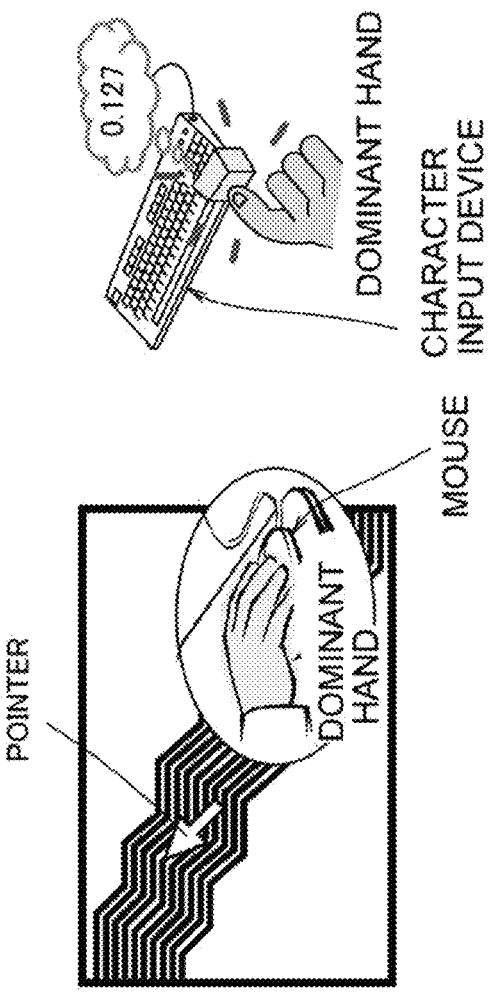
Figure 2A:
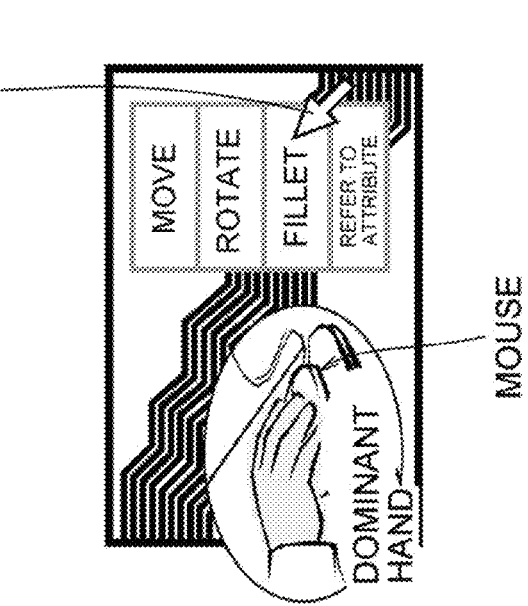

Hereinafter, referring to the attached drawings, an embodiment example of an input information processing system, an input information processing method, a program and a computer-readable recording medium according to the present invention will be explained in detail.

First, FIG. 3 shows a block constitution view for showing a hardware configuration of an electrical design CAD system equipped with an example of the embodiment of the input information processing system according to the present invention.

Specifically, an electrical design CAD system 100 equipped with the input information processing system according to the present invention is realized by a publicly known personal computer, a general-purpose computer or the like, and configured such that the entire action is controlled by a central processing unit (CPU) 10.

Then, to the CPU 10, a storage device 14 which is configured of a read only memory (ROM) that stores a program for controlling the CPU 10, various data and the like, a random access memory (RAM) including a storage region used as a working area of the CPU 10, or the like, a display device 16 including a screen such as a CRT and a liquid crystal panel which performs various displays on the basis of the control of the CPU 10, a mouse 18 as a pointing device being an input device which is operated by the dominant hand of the operator and designates an arbitrary position on a display screen of the display device 16, a touchpad 20 as a pointing device being an input device which is operated by the non-dominant hand of the operator and designates an arbitrary position on the display screen of the display device 16, a character input device 22 such as a keyboard being an input device for inputting arbitrary characters, and an input/output interface circuit (I/O) 24 of various instruments connected to the outside are connected via a bus 12.

Further, in the electrical design CAD system 100, an external storage device 26 such as a hard disc is connected via the I/O 24 and a read/write device 28 that writes and stores various data, which is produced on the basis of the control of a CPU, to a computer-readable recording medium such as a compact disc (CD) and a digital versatile disc (DVD) (hereinafter, appropriately referred to simply as "recording medium") 30 and reads various data stored in the recording medium 30 into the storage device 14 are connected via the I/O 24.

Herein, a program for executing an electrical design processing by the electrical design CAD system 100 (described later) and various data used for the processing may be previously stored in the read only memory or the random access memory of the storage device 14, or may be read into the random access memory of the storage device 14 from the external storage device 26 or the recording medium 30.

Further, a communication function may be provided for the electrical design CAD 100, and a program for executing the electrical design processing by the electrical design CAD system 100 (described later) and various data used for the processing may be read into the random access memory of the storage device 14 of the electrical design CAD system 100 from outside through communication.

Now, in the explanation below, to make understanding for the electrical design CAD system 100 easier, it is assumed that a program for executing the electrical design processing by the electrical design CAD system 100 or various data used for the processing be previously stored in the storage device 14.

Figure 4:
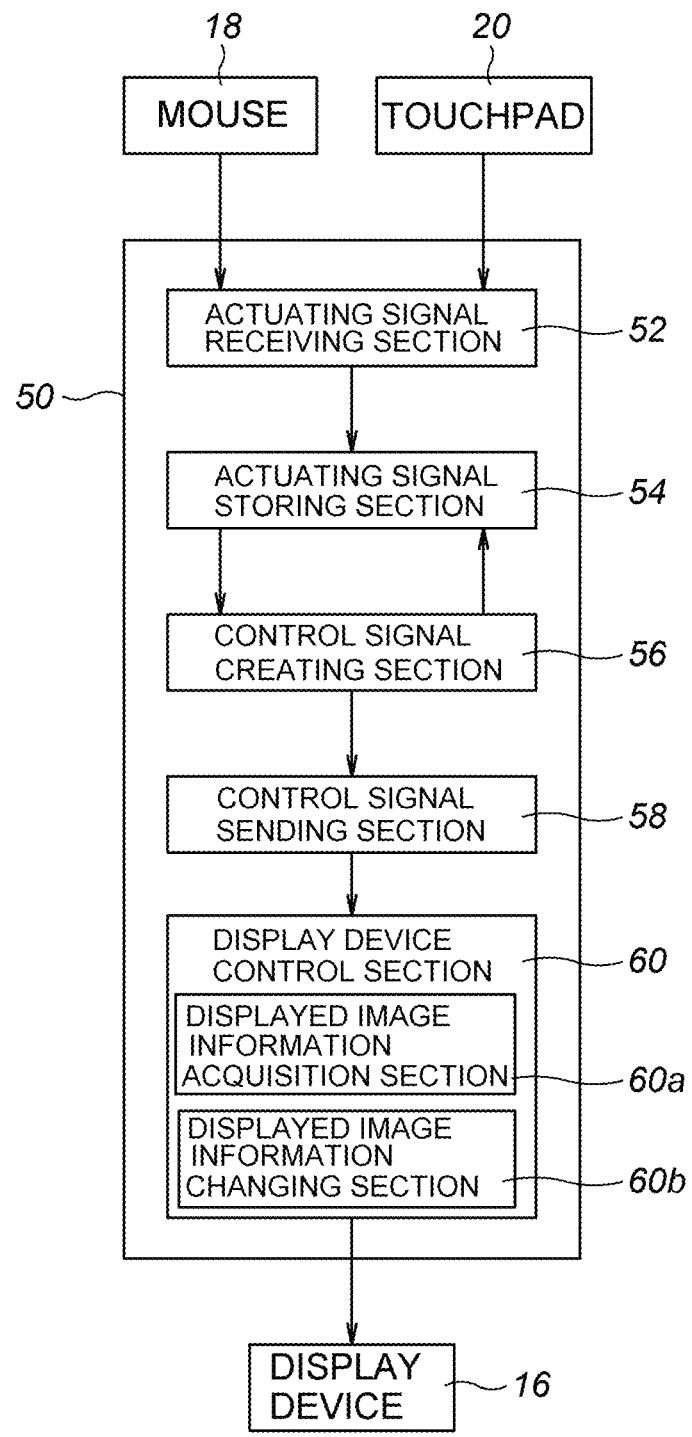
FIG. 4 is a block constitution explanatory view for showing a functional constitution of the input information processing system according to the present invention.

Next, referring to FIG. 4, the input information processing system according to the present invention will be explained in detail. FIG. 4 is a block constitution explanatory view for showing a functional constitution of the input information processing system according to the present invention.

The input information processing system 50 is configured by having: an actuating signal receiving section 52 that receives an actuating signal from the mouse 18 and the touchpad 20, which are provided for the electrical design CAD system 100, indicating how each device was operated; an actuating signal storing section 54 that stores the actuating signal from the mouse 18 and the touchpad 20 received by the actuating signal receiving section 52; a control signal creating section 56 that creates a control signal for controlling the display device 16 on the basis of the actuating signal stored in the actuating signal storing section 54; a control signal sending section 58 that sends the control signal created in the control signal creating section 56 to a display device control section 60 (described later); and a display device control section 60 including a displayed image information acquisition section 60a that acquires information in a displayed image displayed on the display device 16 on the basis of the control signal sent from the control signal sending section 58 and a displayed image information changing section 60b that changes the displayed image displayed on the display means 16 and information in the displayed image.

Note that a hardware configuration of the input information processing system 50 is configured by the CPU 10 and the storage device 14.

In the above-described configuration, contents of the electrical design processing executed by the electrical design CAD system 100 including the input processing equipment 50 according to the present invention will be explained referring to the flowcharts shown in and after FIG. 5.

Herein, in the electrical design CAD system 100, it has conventionally been designed to be capable of inputting a desired instruction by operating each device by an operator similar to a publicly known electrical design CAD system. In the electrical design CAD system 100, two pointing devices, that is, the mouse 18 and the touchpad 20 are provided as pointing devices.

Then, the operator operate the mouse 18 or the touchpad 20 being the two pointing devices or the character input device 22, reads out predetermined data from various data stored in the storage device 14, and performs the electrical design processing explained below.

First of all, the electrical design CAD system 100 including the input information processing system 50 according to the present invention will be explained based on flowcharts (FIGS. 18 to 20) which were created from the viewpoint, of processing contents associated with an operator's operation.

Figure 18:
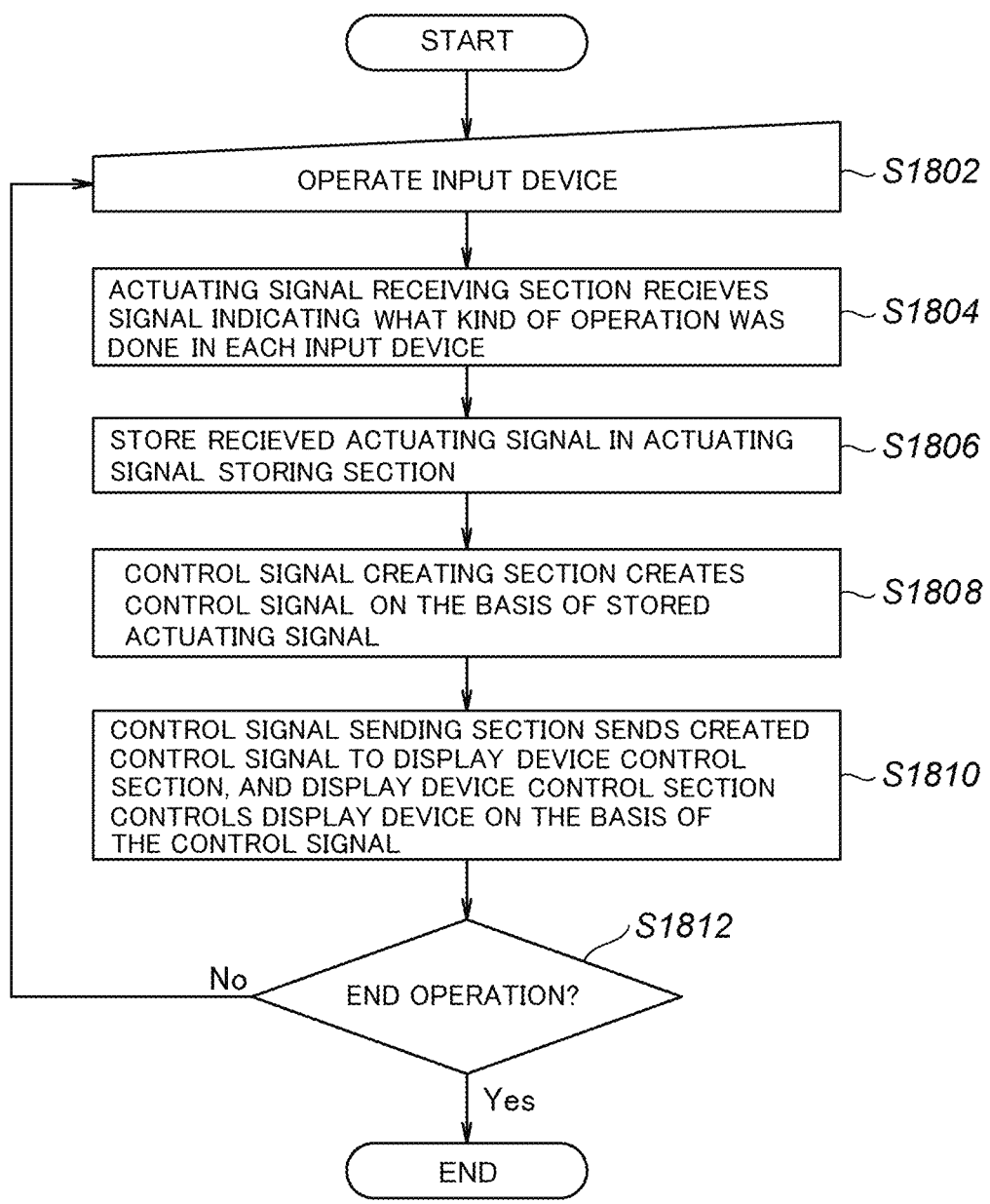
FIG. 18 is a flowchart for showing a processing routine of a processing in the electrical design CAD system equipped with the input information processing system according to the present invention.

FIG. 18 shows a flowchart, which was created from the above-described viewpoint, of a processing routine of a processing in the electrical design CAD system equipped with the input information processing system according to the present invention.

First, at the initial state where the electrical design CAD system 100 was activated, the input information processing system 50 according to the present invention detects in what state each input device is, and store the state of each device in the actuating signal storing section 54. After that, as each input device performs an operation (step S1802), the actuating signal receiving section 52 receives in real time an actuating signal indicating what kind of operation was performed by the input device (step S1804), and after storing the received actuating signal in the actuating signal storing section 54 (step S1806), and creates a control signal on the basis of the actuating signal in the control signal creating section 56 stored (step S1808).

In the processing of step S1808, in the case of moving the mounted component 44 while rotating it by operating the mouse 18 and the touchpad 20 (described in detail in a modified example (18)), the control signal creating section 56 synthesize an actuating signal indicating that the part is operated to move by the mouse 18 and an actuating signal indicating that the part is operated to rotate by the touchpad 20 to create a control signal indicating the mounted component 44 is rotated while being moved.

Then, the control signal sending section 58 sends the control signal created in the control signal creating section 56 to the display device control section 60, and the display device control section 60 controls the display device 16 on the basis of the control signal (step S1810).

After that, end of the operation is confirmed (step S1812), the electrical design CAD system 100 is stopped to end the processing in the case where the operator ended the operation, and the routine returns to the processing of step S1804 in the case where the operator did not end the operation.

Consequently, in the electrical design CAD system equipped with the input information processing system 50 according to the present invention, a parallel operation in which the mounted component 44 is moved by the mouse 18 operated by the dominant hand while the component is rotated by the touchpad 20 operated by the non-dominant hand is made possible.

Next, a processing of the electrical design CAD system equipped with the input information processing system according to the present invention focused on a processing of displaying a displayed image in an enlarged/reduced manner (specifically, processing of steps S616 to S618 and processing of steps S822 to 324 (described later)) will be explained in detail referring to the flowchart shown in FIG. 19 created from the above-described viewpoint.

FIG. 19 shows the flowchart of a processing routine of a processing focused on an enlarging/reducing display processing of a displayed image in the electrical design CAD system equipped with the input information processing system according to the present invention.

As the electrical design CAD system 100 is activated, initialization of the information of the mouse 18 is performed (step S1902), after that, the actuating signal receiving section 52 receives an operating state of the mouse 18 indicating which position the pointer of the mouse 18 moved by an operation by the operator or whether or not the mouse 18 selected an object in a displayed image, as an actuating signal, (step S1904) and the received actuating signal is stored in the actuating signal storing section 54 (step S1906).

After that, as the touchpad 20 is operated to perform an enlarging/reducing operation (step S1908), the actuating signal receiving section 52 receives the actuating signal (step S1910), and the received actuating signal is stored in the actuating signal storing section 54 (step S1912).

Then, the control signal creating section 56 acquires a position displayed on the screen of a pointer corresponding to the mouse 18 or a position displayed on the screen of an object selected by the mouse 18 (herein, in this specification, an object should expresses either the entire object or a specific portion inside the object), and creates a control signal for performing enlarging/reducing display by using the position as the center (step S1914), the control signal sending section 58 sends the created control signal to the display device control section 60, the display device control section 60 controls the display device 16 so as to acquire a position displayed on the screen of the pointer corresponding to the mouse 18 or the position displayed on the screen of the object selected by the mouse 18 and perform enlarging/reducing display by using the position as the center (step S1916).

After that, end of operation is confirmed (step S1918), the electrical design CAD system 100 is stopped to end the processing in the case where the operator ended the operation, and the routine returns to the processing of step S1904 in the case where the operator did not end the operation.

Consequently, in the electrical design CAD system 100 equipped with the input information processing system 50 according to the present invention, by performing enlarging/reducing display using the pointer corresponding to the mouse 18 or the position displayed on the screen of the object selected by the mouse 18 as the center, enlarging/reducing display is made possible without changing the pointer corresponding to the mouse 18 or the position displayed on the screen of the object selected by the mouse 18.

Next, a processing of the electrical design CAD system equipped with the input information processing system according to the present invention when a specific object was selected (corresponds to the processing of steps S802 to S812 or steps S1102 to S1112 (described later)) will be explained in detail referring to the flowchart shown in FIG. 20 created from the above-described viewpoint.

FIG. 20 shows a flowchart for showing a processing routine of a processing when a specific object was selected in the electrical design CAD system equipped with the input information processing system according to the present invention.

As the operator selects a line or a mounted component by the mouse 18 after the electrical design CAD system 100 was activated and initialization of the information of the mouse 18 was performed (step S2002), the actuating signal receiving section 52 receives an actuating signal of the selection (step S2004), and the received actuating signal is stored in the actuating signal storing section 54 (step S2006).

After that, when the touchpad 20 is touched with one finger (step S2008), an actuating signal receiving section 53 receives an actuating signal of the touch (step S2010), and the received actuating signal is stored in the actuating signal storing section 54 (step S2012).

Then, the control signal creating section 56 creates a control signal for displaying the most suitable menu for the selected line or mounted component (S2014) on the basis of an actuating signal indicating that the mouse 18 selected the line or the mounted component and an actuating signal indicating that the touch pad 20 was touched with one finger, the control signal sending section 58 sends the created control signal to the display device control section 60, and the display device control section 60 controls the display device 16 so as to display the most suitable menu for the selected line or mounted component (step S2016).

After that, end of operation is confirmed (step S2018), the electrical design CAD system 100 is stopped to end the processing in the case where the operator ended the operation, and the routine returns to the processing of step S2002 in the case where the operator did not end the operation.

Consequently, in the electrical design CAD system 100 equipped with the input information processing system 50 according to the present invention, by performing menu display or menu operation by an input device different from the mouse 18, specifically, the touchpad 20, a menu operation is made possible without changing the position displayed on the screen of the pointer corresponding to the mouse 18 and the operating state of the mouse 18.

Therefore, in the electrical design CAD system 100 equipped with the input information processing system 50 according to the present invention, not only a parallel operation, but it is also possible to fix the position of a pointer (or selected object etc.) corresponding to the mouse 18 operated by the dominant hand and perform enlarging/reducing display on the touchpad 20 operated by the non-dominant hand or to displayed the most suitable menu of an object, which is selected by the mouse 18 operated by the dominant hand, on an operation panel corresponding to the touchpad 20 operated by the non-dominant hand.

Next, processing contents in response to individual operation contents of the operator will be explained in detail.

Figure 5:
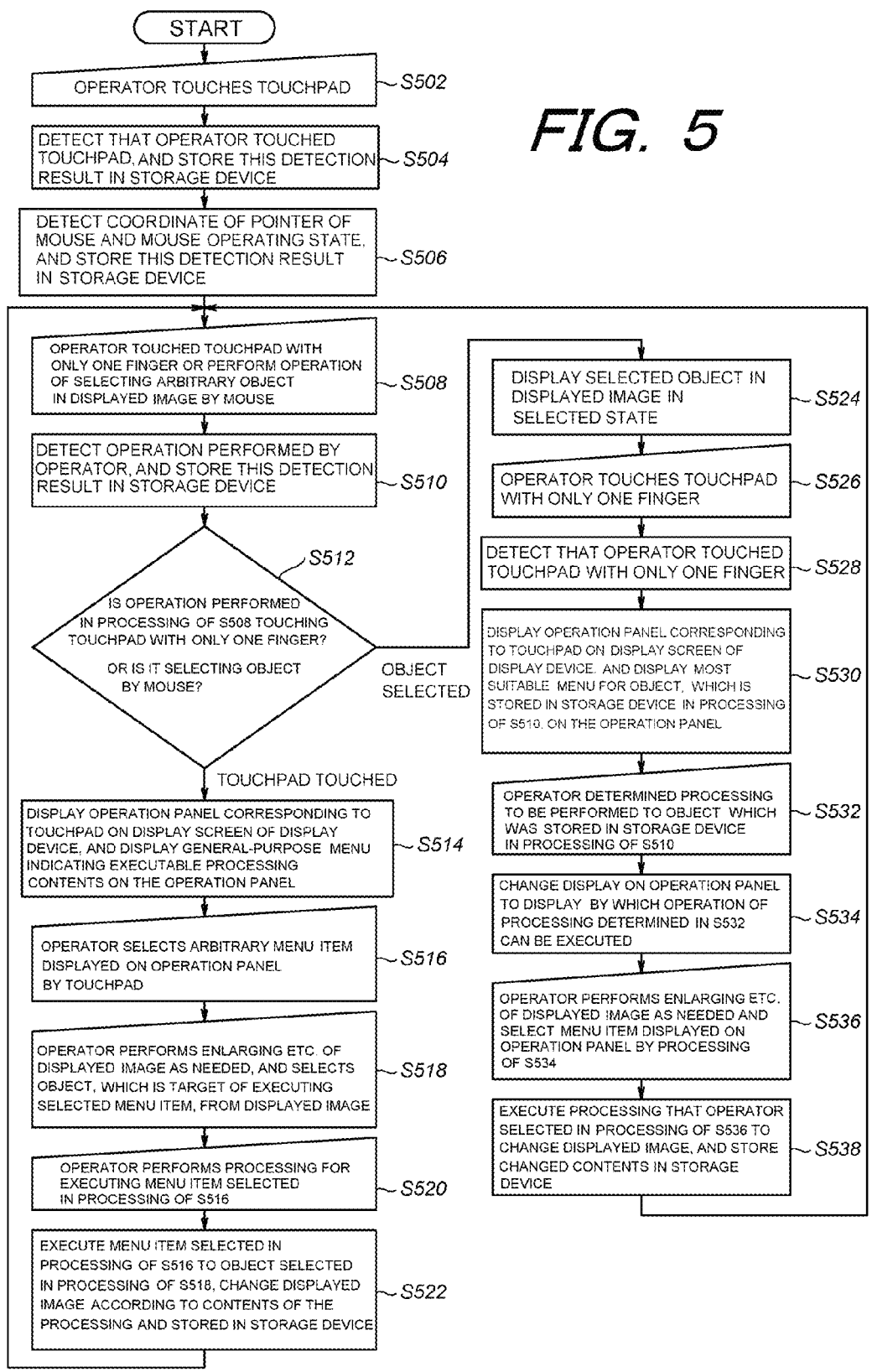
FIG. 5 is a flowchart for showing a processing routine of an electrical design processing executed by the electrical design CAD system equipped with the input information processing system according to the present invention.
Figure 6:
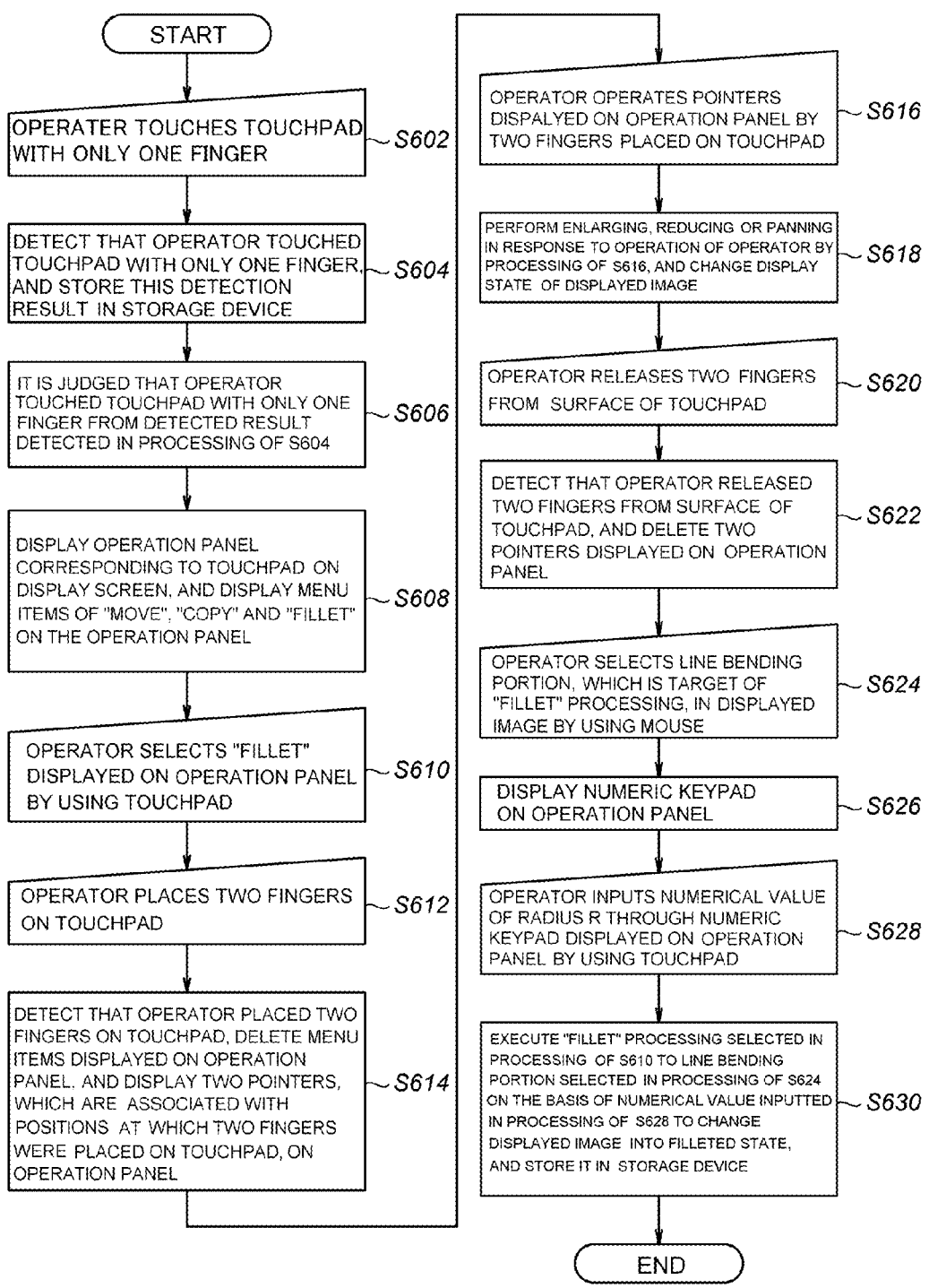
FIG. 6 is a flowchart for showing a processing routine of a processing of filleting to a line bending part as a processing of executing general-purpose menu.

FIG. 5 shows a flowchart or a processing routine of the electrical design processing, and the processing routine of the electrical design processing is activated when the electrical design CAD system 100 is activated and a setting processing of the initial state of the electrical design CAD system 100 (for example, processing of displaying a design screen on the display screen of the display device 16, etc.) ends.

Then, as the operator touches the touchpad 20 in the state where the flowchart of the processing routine of the electrical design processing shown in FIG. 5 is activated (step S502), the fact that a finger of the operator touched the touchpad 20 is detected, and the detection result is stored in the storage device 14 (step S504).

After that, a coordinate value of the pointer corresponding to the mouse 18 and an operating state of the mouse 18 such that a button of the mouse 18 is not pressed or the mouse 18 did not select an object is detected, and the detection result is stored in the storage means 14 (step S506).

In short, initialization of the information of the mouse 18 in the storage device 14 is performed by the processing of step S506.

Specifically, in the initialization of the information of the mouse 18, the actuating signal receiving section 52 receives an operation in which a finger touched the touchpad 20 for the first time after the activation as an actuating signal, and the received actuating signal is stored in the actuating signal storing section 54. At this point, the actuating signal storing section 54 also stores operating state of the mouse 18.

Then, on the basis of the actuating signal indicating that a finger touched the touchpad 20 for the first time after the activation, which is stored in the actuating signal storing section 54, the control signal creating section 56 creates a control signal for acquiring a coordinate value of the pointer corresponding to the mouse 18, the control signal sending section 58 sends the created control signal to the display device control section 60, the displayed image information acquisition section 60*a* of the display device control section 60 acquires a coordinate value of the pointer corresponding to the mouse 18 in the displayed image displayed on the display device 16 on the basis of the control signal.

As such an initialization of the information of the mouse 18 ends, the operator then performs an operation of touching the touchpad 20 with only one finger or selecting an arbitrary object in the displayed image which is displayed on the display screen of the display device 16 by the mouse 18 (step S508).

After that, the operation by the operator of the processing of step S508 is detected, and this detection result is stored in the storage device 14 (step S510).

In short, in the processing of step S510, in the case where the operator touched the touchpad 20 with only one finger, the fact that only one finger touched the touchpad 20 is detected, the number of fingers that touched the touchpad 20 is one is stored in the storage device 14, and in the case where the operator selected an arbitrary object in the displayed image which is displayed on the display screen of the display device 16 by the mouse 18, the fact that an arbitrary object in the displayed image was selected by the mouse 18 is detected, and the selected object is stored in the storage device 14.

Specifically, in the processing of step S510, the actuating signal receiving section 52 receives an operations performed in the mouse 18 and the touchpad 20 as an actuating signal, and the received actuating signal is stored in the actuating signal storing section 54.

More specifically, in the case where the operator touched the touchpad 20 with one finger, the actuating signal receiving section 52 receives an actuating signal indicating that only one finger touched the touchpad 20, and the received actuating signal is stored in the actuating signal storing section 54.

Further, in the case where the operator selected an arbitrary object in the displayed image by the mouse 18, the actuating signal receiving section 52 receives an actuating signal indicating that an arbitrary object was selected by the mouse 18, and the received actuating signal is stored in the actuating signal storing section 54.

Next, from a detection result detected and stored by the processing of step S510, whether or not the operation performed by the operator in the processing of step S508 is an operation of touching the touchpad 20 with only one finger or the operation of selecting an arbitrary object in the displayed image displayed on the display screen of the display device 16 by the mouse 13 is judged (step S512).

Specifically, in the processing of step S512, the control signal creating section 56 judges what kind of actuating signal the actuating signal stored in the actuating signal storing section 54 is. More particularly, the control signal creating section 56 judges whether the actuating signal stored in the actuating signal storing section 54 is an actuating signal indicating that only one finger touched the touchpad 20 or the actuating signal indicating that an arbitrary object in the displayed image was selected by the mouse 18.

In the case of judgment that the operator performed the operation of touching the touchpad 20 with only one finger in the processing of step S508, in the judgment processing of step S512, an operation panel corresponding to the touchpad 20 is displayed at a predetermined position on the display screen of the display device 16, and a general-purpose menu that shows processing contents, which are executable in the state where an object on the display screen is not selected, is displayed on the operation panel (step S514).

Note that menu items such as "move", "copy" and "fillet" are displayed in such a general-purpose menu, for example, and such menu items are previously stored in the storage device 14.

Specifically, in the processing of step S514, on the basis of the judgment result judged in the processing of step S512, the control signal creating section 56 creates the most suitable control signal for the actuating signal.

More specifically, in the case where the actuating signal stored in the actuating signal storing section 54 is judged to be the actuating signal indicating that only one finger touched the touchpad 20, the control signal creating section 56 creates a control signal for displaying the operation panel corresponding to the touchpad 20 at a predetermined position on the display screen of the display device 16 and displaying a general-purpose menu being the processing contents that are executable in the state where an object in the displayed image is not selected on the operation panel, and the control signal sending section 58 sends the created control signal to the display device control section 60.

Then, the display device control section 60 controls the display device 16 so as to display the operation panel at a predetermined position on the display screen of the display device 16 on the basis of the sent control signal and display the menu items such as "move", "copy" and "fillet", for example, on the operation panel, by the displayed image information changing section 60b.

As the operation panel is displayed on the display screen of the display device 16 by the processing of step S514, the operator selects an arbitrary menu item in the general-purpose menu displayed on the operation panel by the touchpad 20 (step S516).

Next, the operator performs enlarging, reducing or panning of the displayed image displayed on the display screen of the display device 16 as needed, and selects a target object to which the menu item selected in the processing of step S516 is executed from the displayed image displayed on the display screen of the display device 16 (step S518).

After that, the operator performs an operation necessary for executing the menu item selected in the processing of step S516 (step S520).

In short, in the processing of step S520, an operation that a numerical value of the radius R is inputted when the menu item selected in the processing of S516 is "fillet" is performed for example.

Then, for the object selected in the processing of step S518, the processing of the menu item selected in the processing of step S516 is executed, the displayed image on the display screen of the display device 16 is changed according to the contents of the processing, and the changed contents are stored in the storage device 14 (step S522).

Specifically, in the processing of step S516 to S522, the actuating signal receiving section 52 receives an actuating signal indicating that one of the general-purpose menu displayed on the operation panel was selected by the touchpad 20, the actuating signal receiving section 52 receives an actuating signal indicating that an object was selected by the mouse 18 after the received actuating signal was stored in the actuating signal storing section 54, and the received actuating signal is stored in the actuating signal storing section 54.

Then, the control signal creating section 56 creates a control signal for executing the selected menu item to the selected object on the basis of the stored actuating signal, the control signal sending section 58 sends the created control signal to the display device control section 60, and the display device control section 60 controls the display device 16 so as to change the displayed image displayed on the display screen of the display device 16 on the basis of the sent control signal by the displayed image information changing section 60b.

As the processing of step S522 ends, the routine returns to the processing of step S508, the operator performs an operation of touching his/her finger to the touchpad 20 again or selecting an arbitrary object in the displayed image which is displayed on the display screen of the display device 16 by the mouse 18, and repeatedly performs the processing of each step on and after step S508 until the electrical design processing ends.

On the other hand, in the judgment processing of step S512, when it is judged that the operator performed the operation of selecting an arbitrary object in the displayed image by the mouse 18 in the processing of step S508, the object selected by the operation is displayed in the displayed image in the state where such selection is identifiable (step S524). It as to be noted that "displayed in the displayed image in the state where such selection is identifiable" means that the selected object is not used in the displayed image and is displayed in striking color, for example.

Specifically, in the processing of step S524, in the case where the actuating signal stored in the actuating signal storing section 54 was judged to be an actuating signal indicating that an arbitrary object in the displayed image was selected by the mouse 18, the control signal creating section 56 creates a control signal for displaying the selected object in the state where such selection is identifiable, and the control signal sending section 58 sends the created control signal to the display device control section 60.

Then, the display device control section 60 controls the display device 16 so as to display the selected object in the display screen displayed on the display device 16 in the state where such selection is identifiable on the basis of the sent control signal, by the displayed image information changing section 60b.

After that, the operator touches the touchpad 20 with only one finger (step S526), and it is detected that the operation of touching the touchpad 20 with only one finger was performed by the operator (step S528).

In short, in the processing of step S526, the operation of touching the touchpad 20 with only one finger is performed by the operator in the state where an object was selected.

Next, an operation panel corresponding to the touchpad 20 is displayed at a predetermined position on the display screen of the display device 16, and a menu showing the most suitable processing contents (for example, processing contents frequently used in the object, processing contents necessary for the object, etc.) for the object stored in the storage device 14 in the processing of step S510 (that is, the object selected in the processing of step S508) is displayed on the operation panel (step S530).

Now, regarding a menu showing the most suitable processing contents for such an object, menu items such as "manual wiring", "automatic wiring" and "45-degree wiring" are displayed in the case where the object is a line, for example, and menu items such as "replace part", "replace pin" and "replace gate" are displayed in the case where the object is a mounted component, for example, and such menu items are previously stored in the storage device 14.

Specifically, in the processing of step S526 to S530, the actuating signal receiving section 52 receives an actuating signal indicating that only one finger touched the touchpad 20, and the received actuating signal is stored in the actuating signal storing section 54.

After that, the control signal creating section 56, on the basis of the actuating signal indicating that an object in the displayed image was selected by the mouse 18 and an actuating signal indicating that the stored actuating signal touched the touchpad 20 with only one finger, displays the operation panel at a predetermined position on the display screen of the display device 16, and creates a control signal for displaying a menu item showing the most suitable processing contents for the selected object on the operation panel, and the control signal sending section 58 sends the created control signal to the display device control section 60.

Then, the display device control section 60 controls the display, device 16 such that the operation panel is displayed at a predetermined position on the display screen of the display device 16 on the basis of the sent control signal and a menu item showing the most suitable processing contents for the selected object is displayed on the operation panel, by the displayed image information changing section 60b.

Next, the operator determines a processing executed to the object stored in the storage device 14 in the processing of step S510 (step S532).

In short, in the processing of step S532, by selecting a menu item displayed on the operation panel in the processing of step S530, executing of the selected menu item to the object selected is determined by the processing step S508, or moving of the selected object is determined by placing the pointer corresponding to the mouse 18 to the object selected in the processing of step S508 while the button of the mouse 18 is kept on being pressed.

As the processing to be executed to the object is determined by the processing of step S532, a display on the operation panel is changed to a display by which an operation of executing the processing contents determined by the processing of step S532 can be performed (step S534).

After that, the operator performs enlarging, reducing, panning or the like of the displayed image displayed on the display screen of the display device 16 as needed, and selects the menu item displayed on the operation panel by the processing of step S534 by using the touchpad 20 (step S536).

Then, the processing selected by the operator by the processing of step S536 is executed to change the displayed image on the display screen of the display device 16, and the changed contents are stored in the storage device 14 (step S538).

Specifically, in the processing of step S532 to S538, the actuating signal receiving section 52 receives an actuating signal indicating that one of the menu items displayed on the operation panel was selected by the touchpad 20 and an actuating signal indicating that the pointer was placed to the object by the mouse 18 while the button of the mouse 18 was kept on being pressed, and the received actuating signal is stored in the actuating signal storing section 54. Then, the control signal creating section 56 creates a control signal suitable for the stored actuating signal.

Specifically, in the case where the actuating signal stored in the actuating signal storing section 54 in this processing as the actuating signal indicating that one of the menu items displayed on the operation panel was selected by the touchpad 20, the control signal creating section 56 creates a control signal for executing the selected menu item to the selected object. After that, the control signal sending section 58 sends the created control signal to the display device control section 60, and the display device control section 60 controls the display device 16 so as to change the displayed image displayed on the display screen of the display device 16 on the basis of the sent control signal by the displayed image information changing section 60b.

On the other hand, in the case where the actuating signal stored in the actuating signal storing section 54 in this processing is the actuating signal indicating that the pointer was placed to the object by the mouse 18 while the button of the mouse 18 was kept on being pressed, the control signal creating section 56 creates a control signal for bringing the object to which the pointer was placed to a movable state by the mouse 18, and the control signal sending section 58 sends the created control signal to the display device control section 60. Then, the display device control section 60 controls the display device 16 so as to bring the object to which the pointer was placed to a movable state by the mouse 18 by the displayed image information changing section 60.

After that, as the operator placed the pointer to the object by the mouse 18 and moves the mouse 18 while pressing the button of the mouse 18, the actuating signal receiving section 52 receives an actuating signal indicating that the pointer of the mouse 18 was placed to the object and the mouse 18 was moved while the button of the mouse 18 was pressed, and the received actuating signal is stored in the actuating signal storing section 54. Then, on the basis of the stored actuating signal, the control signal creating section 56 creates a control signal for moving the object in response to a moved amount of the mouse 18, and the control signal sending section 58 sends the created control signal to the display device control section 60. After that, the display device control section 60 controls the display device 16 so as to move the object in response to a moved amount of the mouse 18 by the displayed image information changing section 60b.

As the processing of step S538 ends, the routine returns to the processing of step S508, the operator performs an operation of touching his/her finger to the touchpad 20 again or selecting an arbitrary object in the displayed image which is displayed on the display screen of the display device 16 by the mouse 18, and repeatedly performs the processing of each step on and after step S508 until the electrical design processing ends.

Next, referring to each drawing of FIG. 6 to FIG. 13, an electrical design processing executed by the electrical design CAD system 100 will be explained by showing a specific example.

Now as a specific example, a case of filleting a desired line bending, part out of a plurality of lines that constitute a wiring harness will be explained as a processing of executing a general-purpose menu, and a case of selecting a line as an object and performing manual wiring and a case of selecting a mounted component as an object will be explained as a processing of executing a menu showing the most suitable processing contents for a selected object.

1. Case of Filleting a Line Bending Part (Specific Example Regarding the Processing of Step S514 to Step S522).

In the case of filleting a line bending part as a processing of executing a general-purpose menu, the operator touches the touchpad 20 with only one finger (step S602: corresponding to the processing of the above-described step S508) first in the state where the initialization of the information of the mouse 18 in the storage device 14 ended (the state where processing corresponding to the processing of the above-described step S502 to step S506 ended).

And then, the fact that the operator touched the touchpad 20 with only one finger is detected, and the fact that the number of fingers that touched the touchpad 20 is one is stored in the storage device 14 (step S604: corresponding to the processing of the above-described step S510).

Specifically, in the processing of step S604, the actuating signal receiving section 52 receives an actuating signal indicating that only one finger touched the touchpad 20, and the received actuating signal is stored in the actuating signal storing section 54.

Figure 7A:
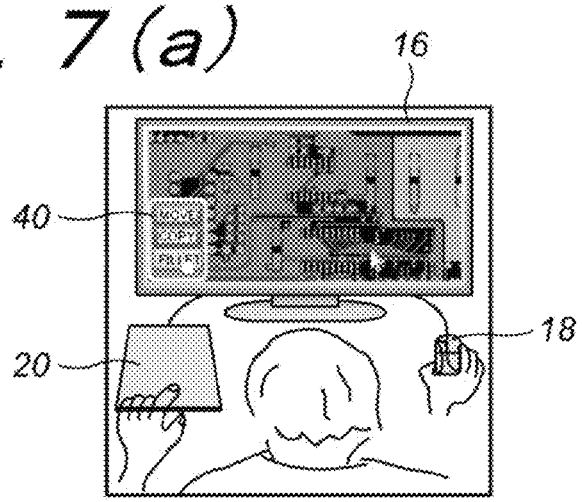
FIG. 7(a) is an explanatory view for showing the state where an operation panel, on which the general-purpose menu is displayed, is displayed on a display screen. Further.

Then, it is judged that the operator touched the touchpad 20 with only one finger on the basis of the detection result detected in the processing of step S604 (step S606: corresponding to the processing of the above-described step S512), and as shown in FIG. 7(a), an operation panel 40 corresponding to the touchpad 20 is displayed at a predetermined position on the display screen of the display device 16, and the menu items of "move", "copy" and "fillet" which are processing contents executable in the state where an object is not selected are displayed on the operation panel 40 as a general-purpose menu, (step S608: corresponding to the processing of the above-described step S514).

Specifically, in the processing of step S606 to S608, the control signal creating section 56 judges that the actuating signal stored in the actuating signal storing section 54 is the actuating signal indicating that only one finger touched the touchpad 20 and displays the operation panel 40 corresponding to the touchpad 20 at a predetermined position on the display screen of the display device 16, creates a control signal for displaying the menu items of "move", "copy" and "fillet" as a general-purpose menu being processing contents that are executable in the state where an object in the displayed image is not selected on the operation panel 40, and the control signal sending section 58 sends the created control signal to the display device control section 60.

Then, the display device control section 60 controls the display device 16 so as to display the operation panel 40 at a predetermined position on the display screen of the display device 16 and display the menu items of "move", "copy" and "fillet" on the operation panel 40 by the displayed image information changing section 60b.

As the operation panel 40 is displayed on the display screen of the display device 16 by the processing of step S608, the operator selects "fillet" out of the general-purpose menu displayed on the operation panel 40 by using the touchpad 20 (step S610: corresponding to the processing of the above-described step S516).

Now in the processing of step S610, the operator selects "fillet" out of the general-purpose menu displayed on the operation panel 40 by using only one finger on the touchpad 20.

Specifically, in the processing of step S610, as the operator selects "fillet" out of the general-purpose menu displayed on the operation panel 40 by the touchpad 20, the actuating signal receiving section 52 receives an actuating signal indicating that "fillet" was selected out of the general-purpose menu displayed on the operation panel 40 by the touchpad 20, and the received actuating signal is stored in the actuating signal storing section 54.

Figure 7B:
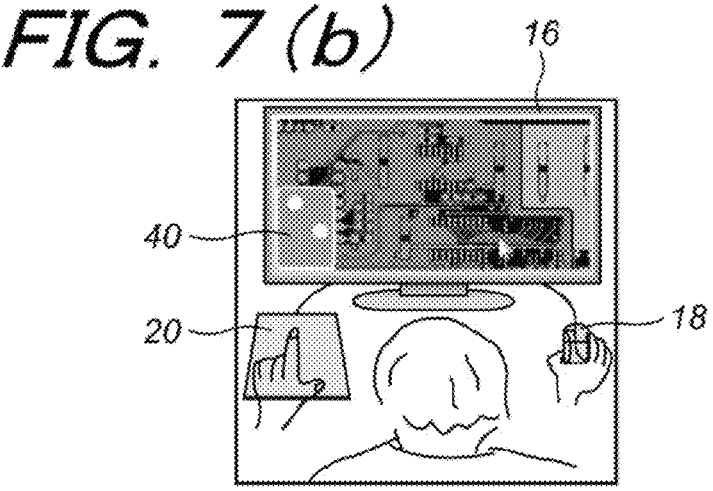
FIG. 7(b) is an explanatory view for showing the state where two pointers that are associated with positions where operator's two fingers on a touchpad are placed are displayed on the operation panel displayed on the display screen.

Next, as the operator places two fingers on the touchpad 20 (step S612), the fact that the operator placed two fingers on the touchpad 20 is detected, the menu items of the general-purpose menu displayed on the operation panel 40 are deleted, and as shown in FIG. 7(b), two pointers associated with positions on the touchpad 20 where the operator's two fingers were placed are displayed on the operation panel 40 (step S614).

Specifically, in the processing of step S612 to S614, as the operator places two fingers on the touchpad 20, the actuating signal receiving section 52 receives an actuating signal indicating that two fingers were placed on the touchpad 20, the received actuating signal is stored in the actuating signal storing section 54, the control signal creating section 56 creates a control signal for deleting the menu items of general-purpose menu displayed on the operation panel 40 on the basis of the stored actuating signal and displaying two pointers associated with positions at which two fingers on the touchpad 20 are placed on the operation panel 40.

After that, the control signal sending section 58 sends the created control signal to the display device control section 60, and the display device control section 60 controls the display device 16 so as to display the two pointers associated with the positions at which two fingers on the touchpad 20 are placed on the operation panel 40 by the displayed image information changing section 60*b*.

Then, the operator operates the two pointers displayed on the operation panel 40 with the two fingers placed on the touchpad 20 (step S616).

In short, a gap between the two fingers is widened in the state where the two fingers contacted on the touchpad 20 when the displayed image displayed on the display screen of the display device 16 needs to be enlarged, a gap between the two fingers is narrowed in the state where the two fingers contacted on the touchpad 20 when the displayed image displayed on the display screen of the display device 16 needs to be reduced, and the two fingers are moved together in a direction where panning needs to be done in the state where the two fingers contacted on the touchpad 20 when the displayed image displayed on the display screen of the display device 16 needs to be panned.

At this point, a display state of the displayed image displayed on the display screen of the display device 16 is changed in response to the operation of the operator by the processing of step S616 (step S618) in short, in the processing of step S616, a coordinate value of the pointer corresponding to the mouse 18 in the displayed image is acquired and the displayed image is displayed in an enlarged manner by using a position indicated by the coordinate value as the center in the case where the operator widened a gap between the two fingers placed on the touchpad 20, a coordinate value of the pointer corresponding to the mouse 18 in the displayed image is acquired and the displayed image is displayed in a reduced manner by using the position indicated by the coordinate value as the center in the case where the operator narrowed a gap between the two fingers placed on the touchpad 20, and in the case where the operator moved the two fingers placed on the touchpad 20 together in an arbitrary direction the displayed image is slowly moved such that the direction is displayed.

As described above, in enlarging or reducing the displayed image, enlarging/reducing is conducted by using a coordinate value of the pointer corresponding to the mouse 18 as the center, so in the displayed image displayed on the display screen, the enlarging and reducing processing of the displayed image can be performed without changing the position of the pointer before and after the processing. In short, the enlarging and reducing processing of the displayed image can be executed in a fixed state without changing the display position of the pointer corresponding to the mouse 18.

Further, in panning, panning is performed in a predetermined direction without changing the position of the pointer in the displayed image displayed on the display screen in the state where a position indicated by a coordinate value on the displayed image at which the pointer corresponding to the mouse 18 is positioned. In short, in panning, panning is performed in a predetermined direction in the state where the pointer is displayed on the display screen and without changing a position on the displayed image at which the pointer is positioned.

It is to be noted that in enlarging or reducing such a di splayed image, enlarging/reducing of the displayed image is performed at continuous power in response to the size of a gap between the two fingers which is widened or narrowed by the operator on the touchpad 20.

Specifically, in the processing of step S616 to S618, on the basis of the actuating signal indicating that only one finger touched the touchpad 20 and the actuating signal in response to an operation of the two fingers on the touchpad 20, the control signal creating section 56 creates a control signal in response to the two actuating signals.

More particularly, in the case where the operator widened a gap between the two fingers placed on the touchpad 20, the actuating signal receiving section 52 receives the actuating signal indicating that a gap between the two fingers was widened in the state where the two fingers contacted on the touchpad 20, and the received actuating signal is stored in the actuating signal storing section 54.

Then, on the basis of the stored actuating signal (that is, the actuating signal indicating that only one finger touched the touchpad 20 and the actuating signal indicating that a gap between the two fingers was widened in the state where the two fingers contacted on the touchpad 20), the control signal creating section 56 creates a control signal for acquiring a coordinate value of the pointer corresponding to the mouse 18 and displaying the displayed image displayed on the display screen of the display device 16 in an enlarged manner in response to a widened amount of a gap between the two fingers by using a position indicated by the acquired coordinate value as the center.

After that, the control signal sending section 58 sends the created control signal to the display device control section 60, and the display device control section 60 controls the display device 16 so as to acquire a coordinate value of the pointer corresponding to the mouse 18 by the displayed image information acquisition section 60*a* and display the displayed image displayed on the display screen of the display device 16 in an enlarged manner in response to a widened amount of a gap between the two fingers by using a position indicated by the acquired coordinate value as the center by the displayed image information changing section 60*b*.

Further, in the case where the operator narrowed a gap between the two fingers on the touchpad 20, the actuating signal receiving section 52 receives an actuating signal indicating that a gap between the two fingers was narrowed in the state where the two fingers contacted on the touchpad 20, and the received actuating signal is stored in the actuating signal storing section 54.

Then, on the basis of the stored actuating signal (that is, the actuating signal indicating that only one finger touched the touchpad 20 and the actuating signal indicating that a gap between the two fingers was narrowed in the state where the two fingers contacted on the touchpad 20), the control signal creating section 56 creates a control signal for acquiring a coordinate value of the pointer corresponding to the mouse 18 and displaying the displayed image displayed on the display screen of the display device 16 in a reduced manner in response to a narrowed amount of a gap between the two fingers by using the position indicated by the acquired coordinate value as the center.

After that, the control signal sending section 58 sends the created control signal to the display device control section 60, and the display device control section 60 controls the display device 16 so as to acquire a coordinate value of the pointer corresponding to the mouse 18 by the displayed image information acquisition section 60*a* and display the displayed image displayed on the display screen of the display device 16 in a reduced manner in response to a narrowed amount of a gap between the two fingers by using the position indicated by the acquired coordinate value as the center by the displayed image information changing section 60*b*.

Further, in the case where the operator moved two fingers together in an arbitrary direction on the touchpad 20, the actuating signal receiving section 52 receives an actuating signal indicating that the two fingers were moved together in a predetermined direction in the state where the two fingers contacted on the touchpad 20, and the received actuating signal is stored in the actuating signal storing section 54.

Then, on the basis of the stored actuating signal (that is, the actuating signal indicating that only one finger touched the touchpad 20 and the actuating signal indicating that the two fingers were moved together in a predetermined direction in the state where the two fingers contacted on the touchpad 20), the control signal creating section 56 creates a control signal for acquiring a coordinate value of the pointer corresponding to the mouse 18 and panning the displayed image displayed on the display screen of the display device 16 in a direction where the two fingers were moved together in the state where a position indicated by the acquired coordinate value is displayed.

After that, the control signal sending section 58 sends the created control signal to the display device control section 60, and the display device control section 60 controls the display device 16 such that a coordinate value of the pointer corresponding to the mouse 18 is acquired by the displayed image information acquisition section 60a, and the pointer is positioned at a position indicated by the acquired coordinate value and panning is performed in a predetermined direction within a range where the pointer is displayed on the display screen by the displayed image information changing section 60b.

Then, as the operator releases the two fingers from the surface of the touchpad 20 (step S620), the fact that the operator released the two fingers from the touchpad 20 is detected, and the two pointers displayed on the operation panel 40 are deleted (step S622).

Specifically, in the processing of step S620 to S622, as the operator releases the two fingers from the surface of the touchpad 20, the actuating signal receiving section 52 receives an actuating signal indicating that the two fingers were released from the surface of the touchpad 20, and the received actuating signal is stored in the actuating signal storing section 54.

Then, on the basis of the actuating signal stored in the actuating signal storing section 54, the control signal creating section 56 creates a control signal for deleting the two pointers displayed on the operation panel 40.

After that, the control signal sending section 58 sends the created control signal to the display device control section 60, and the display device control section 60 controls the display device 16 so as to delete the two pointers displayed on the operation panel 40 by the displayed image information changing section 60b.

Next, the operator selects a line bending part which is a target of a "fillet" processing selected from the general-purpose menu in the processing of step S610 by using the mouse 18, in the displayed image displayed on the display screen of the display device 16 (step S624).

It is to be noted that the processing of step S612 to step S624 explained above corresponds to the above-described processing of step S518.

Figure 7C:
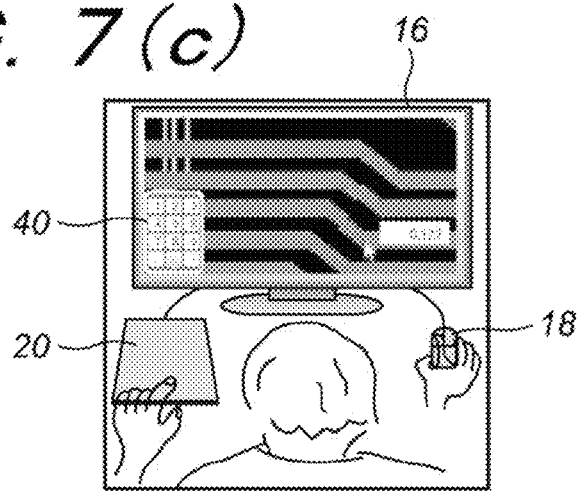
FIG. 7(c) is an explanatory view for showing the state where a numeric keypad is displayed on the operation panel displayed on the display screen.

As the line bending part which is a target of the "fillet" processing is selected in the processing of step S624, a numeric keypad is displayed on the operation panel 40 as shown in FIG. 7(c) (step S626).

Specifically, in the processing of step S624 to S626, as the operator selects the line bending part which is a target of the "fillet" processing by using the mouse 18, the actuating signal receiving section 52 receives an actuating signal indicating that the line bending part in the displayed image was selected by the mouse 18, and the actuating signal storing section 54 stores the received actuating signal.

Then, on the basis of the stored actuating signals (that is, the actuating signal indicating that "fillet" was selected out of the general-purpose menu displayed on the operation panel 40 by the touchpad 20 and the actuating signal indicating that the line bending part in the displayed image was selected by the mouse 18), the control signal creating section 56 creates a control signal for displaying the numeric keypad on the operation panel 40, and the control signal sending section 58 sends the created control signal to the display device control section 60.

And then, the display device control section 60 controls the display device 16 so as to display the numeric keypad on the operation panel 40 by the displayed image information changing section 60b.

After that, as the operator inputs a numerical value of the radius R by the numeric keypad displayed on the operation panel 40 by using the touchpad 20 (step S628: corresponding to the above-described processing of step S520), the "fillet" processing selected in the processing of step S610 is executed to the line bending part which was selected in the processing of step S624 to change a displayed image of the line bending part to a filleted state on the basis of the numerical value inputted in the processing of step S628, and the filleted state is stored in the storage device 14 (step S630: corresponding to the above-described processing of step S522).

Specifically, in the processing of step S628 to S630, as the operator inputs a numerical value of the radius R by the numeric keypad displayed on the operation panel 40 by using the touchpad 20, the actuating signal receiving section 52 receives an actuating signal indicating that a numerical value is inputted by the touchpad 20 using the numeric keypad displayed on the operation panel 40, and the actuating signal storing section 54 stores the received actuating signal.

Then, on the basis of the stored actuating signals (that is, the actuating signal indicating that "fillet" was selected out of the general-purpose menu displayed on the operation panel 40 by the touchpad 20, the actuating signal indicating that the line bending part in the displayed image was selected by the mouse 18, and the actuating signal indicating that the numerical value is inputted by the touchpad 20 using the numeric keypad displayed on the operation panel 40), the control signal creating section 56 creates a control signal for transforming the selected line bending part into an arc shape having the inputted numerical value as a radius, and the control signal sending section 58 sends the created control signal to the display device control section 60.

And then, the display device control section 60 controls the display device 16 so as to transform the line bending part into an arc shape having the inputted numerical value as a radius by the displayed image information changing section 60b.

2. Case of Selecting a Line as an Object and Performing Manual Wiring (Specific Example Regarding the Processing of Step S524 to Step S538)

In the case where a line is selected as an object as a processing in which a menu showing the most suitable processing contents for a selected object is executed, the operator selects a line 42 first in the displayed image displayed on the display screen of the display device 16 by using the mouse 18 in the state where the initialization of the information of the mouse 18 in the storage device 14 ended (state where a processing corresponding to the processing of step S502 to step S506 ended), (step S802: corresponding to the processing of step S508).

And then, the fact that the operator selected the line 42 by the mouse 18 is detected, and the selected line 42 is stored in the storage device 14 (step S804: corresponding to the above-described processing of step S510).

Specifically, in the processing of step S804, the actuating signal receiving section 52 receives the actuating signal indicating that the mouse 18 selected the line 42, and the received actuating signal is stored in the actuating signal storing section 54.

Figure 9A:
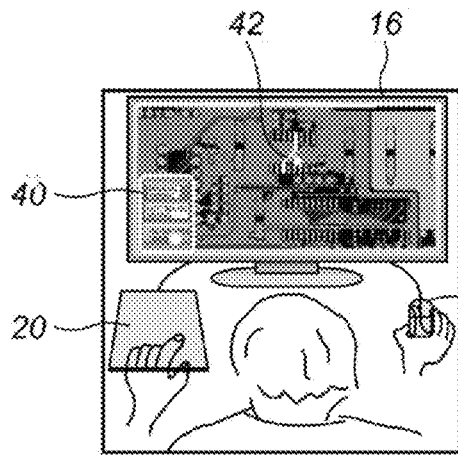
FIG. 9(a) is an explanatory view for showing the state where a selected line is displayed in white color in a displayed image and the state of displaying an operation panel that displays the menu showing the most suitable processing content for the selected line on the display screen. Further.

Then, from a detection result detected and stored by the processing of step S804, it is judged that the operator performed the operation of selecting the line 42 by using the mouse 18 (step S806: corresponding to the processing of step S512), and as shown in FIG. 9(a), the line 42 stored in the storage device 14 in the processing of step S804 is displayed in white color in the displayed image (step S808: corresponding to the processing of step S524).

Specifically, in the processing of step S806 to S808, the control signal creating section 56 judges that the signal stored in the actuating signal storing section 54 was an actuating signal indicating that the mouse 18 selected the line 42, creates a control signal for displaying the line 42 in white color in the displayed image, and the control signal sending section 58 sends the created control signal to the display device control section 60.

Then, the display device control section 60 controls the display device 16 so as to display the line 42 in white color by the displayed image information changing section 60b.

After that, the operator touches the touchpad 20 with only one finger (step S810: corresponding to the above-described processing of step S526).

At this point, the fact that the operator touched the touchpad 20 with only one finger is detected, and as shown in FIG. 9(a), the operation panel 40 corresponding to the touchpad 20 is displayed at a predetermined position on the display screen of the display device 16, and the menu items of "manual wiring", "automatic wiring" and "45-degree wiring" which are the most suitable processing contents in the line 42 stored in the storage device 14 in the processing of step S804 (that is, the line 42 selected in the processing of step S802) are displayed on the operation panel 40 (step S812: corresponding to the processing of step S528 and step S530).

Specifically, in the processing of step S810 to S812, as the operator touches the touchpad 20 with only one finger, the actuating signal receiving section 52 receives the actuating signal indicating that only one finger touched the touchpad 20, and the received actuating signal is stored in the actuating signal storing section 54.

Then, the control signal creating section 56 on the basis of the actuating signal indicating that the mouse 18 selected the line 42 and the actuating signal indicating that only one finger touched the touchpad 20, creates a control signal for displaying the operation panel 40 corresponding to the touchpad 20 at a predetermined position on the display screen of the display device 16 and displaying the menu items of "manual wiring", "automatic wiring" and "45-degree wiring" on the display panel 40, and the control signal sending section 58 sends the created control signal to the display device control section 60.

And then, the display device control section 60, on the basis of the sent control signal, controls the display device 16 so as to display the operation panel 40 at a predetermined position on the display screen and display the menu items of "manual wiring", "automatic wiring" and "45-degree wiring" on the operation panel 40 by the displayed image information changing section 60b.

As the operation panel 40 is displayed on the display screen of the display device 16 by the processing of step S812, the operator selects "manual wiring", for example, out of the menu items displayed on the operation panel 40 by using the touchpad 20 (step S814: corresponding to the processing of step S532).

It is to be noted that, in the processing of step S814, the operator selects "manual wiring" out of the menu items displayed on the operation panel 40 on the touchpad 20 by using only one finger.

Figure 9B:
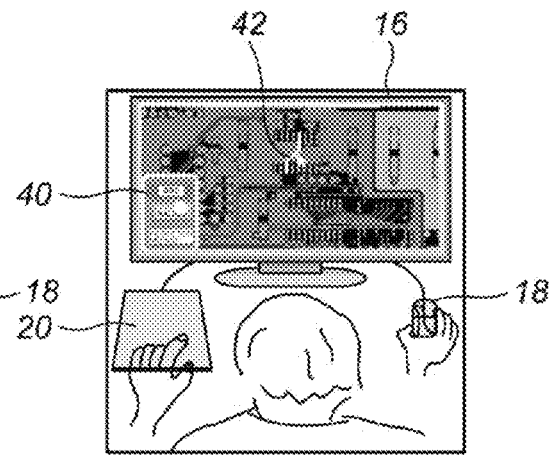
FIG. 9(b) is an explanatory view for showing the state where a menu item displayed on the operation panel is changed. Further.

As "manual wiring" displayed on the operation panel 40 is selected by the processing of step S814, the menu items displayed on the operation panel 40 are deleted, and as shown in FIG. 9(b), the menu items of "arc", "radius" and "instruction method" are displayed on the operation panel 40 (step S816: corresponding to the processing of step S534).

Specifically, in the processing of step S814 to S816, as the operator selects "manual wiring" out of the menu items displayed on the operation panel 40 by using the touchpad 20, the actuating signal receiving section 52 receives an actuating signal indicating that the menu item of "manual wiring" displayed on the operation panel 40 was selected by the touchpad 20, and the received actuating signal is stored in the actuating signal storing section 54.

Then, on the basis of the stored actuating signal, the control signal creating section 56 creates a control signal for deleting the menu items of "manual wiring", "automatic wiring" and "45-degree wiring" displayed on the operation panel 40 and displaying the menu items of "arc", "radius" and "instruction method" on the operation panel 40, and the control signal sending section 58 sends the created control signal to the display device control section 60.

And then, the display device control section 60 controls the display device 16 so as to delete the menu items of "manual wiring", "automatic wiring" and "45-degree wiring" displayed on the operation panel 40 and display the menu items of "arc", "radius" and "instruction method" on the operation panel 40 by the displayed image information changing section 60b.

Figure 9C:
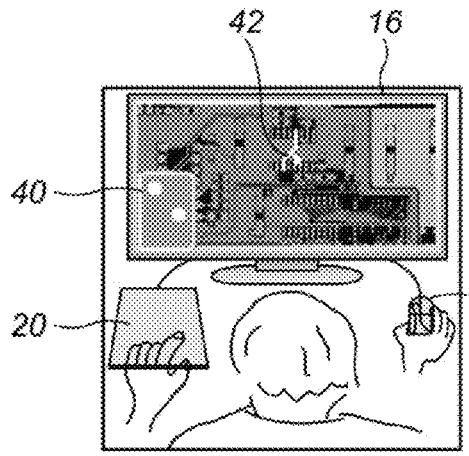
FIG. 9(c) is an explanatory view for showing the state where two pointers that are associated with positions where the operator's two fingers on the touchpad are placed are displayed on the operation panel displayed on the display screen.

Next, as the operator places two fingers on the touchpad 20 (step S818), the fact that the operator placed the two fingers on the touchpad 20 is detected, the menu items displayed on the operation panel 40 are temporarily deleted, and as shown in FIG. 9(c), two pointers associated with positions on the touchpad 20 where the operator's two fingers were placed are displayed on the operation panel 40 (step S820).

Specifically, in the processing of step S818 to S820, as the operator places two fingers on the touchpad 20, the actuating signal receiving section 52 receives an actuating signal indicating that the two fingers were placed on the touchpad 20, the received actuating signal is stored in the actuating signal storing section 54, and on the basis of the stored actuating signal, the control signal creating section 56 creates a control signal for deleting the menu items of "arc", "radius" and "instruction method" displayed on the operation panel 40 and displaying two pointers associated with positions at which the two fingers on the touchpad 20 were placed, on the operation panel 40.

After that, the control signal sending section 58 sends the created control signal to the display device control section 60, and the display device control section 60 controls the display device 16 so as to display two pointers associated with the positions on the touchpad 20 at which the two fingers were placed on the operation panel 40 by the displayed image information changing section 60b.

Then, the operator operates the two pointers displayed on the operation panel 40 by the two fingers placed on the touchpad 20 (step S822).

In short, a gap between the two fingers is widened in the state where the two fingers contacted on the touchpad 20 when the displayed image displayed on the display screen of the display device 16 needs to be enlarged, a gap between the two fingers is narrowed in the state where the two fingers contacted on the touchpad 20 when the displayed image displayed on the display screen of the display device 16 needs to be reduced, and the two fingers are moved together in a direction where panning needs to be done in the state where the two fingers contacted on the touchpad 20 when the displayed image displayed on the display screen of the display device 16 needs to be panned.

At this point, in response to an operation of the operator by the processing of step S822, a display state of the displayed image displayed on the display screen of the display device 16 is changed (step S824).

In short, in the processing of step S822, a coordinate value in the displayed image of the line 42 stored in the storage device 14 in the processing of step S804 (that is, the line 42 selected in the processing of step S802) is acquired and the displayed image is displayed in an enlarged manner by using a position indicated by the coordinate value as the center in the case where the operator widened a gap between the two fingers placed on the touchpad 20, a coordinate value in the displayed image of the line 42 stored in the storage device 14 in the processing of step S804 (that is, the line 42 selected in the processing of step S802) is acquired and the displayed image is displayed in a reduced manner by using the position indicated by the coordinate value as the center in the case where the operator narrowed a gap between the two fingers placed on the touchpad 20, and in the case where the operator moved the two fingers placed on the touchpad 20 together in an arbitrary direction, the displayed image is slowly moved such that the direction is displayed.

It is to be noted that a coordinate value of the center point of the line 42 is acquired as a coordinate value of the line 42, for example.

In short, in enlarging or reducing the displayed image, enlarging/reducing is conducted by using a position indicated by a coordinate value of the center point of the line 42 as the center, so that the line 42 is always displayed on the display screen of the display device 16.

As described above, enlarging/reducing is conducted by using a position indicated by a coordinate value of the center point of the line 42 as the center in enlarging or reducing the displayed image, so that the enlarging and reducing processing can be performed in the displayed image displayed on the display screen without disappearing the line 42 from the displayed image before and after the processing in short, the enlarging and reducing processing of the displayed image can be executed in the state where a position indicated by a coordinate value of the center point of the line 42 is not changed but fixed.

Further, in panning, panning is performed in a predetermined direction within a range where the line 42 can be positioned on the display screen of the display device 16.

It is to be noted, in enlarging or reducing such a displayed image, that enlarge/reducing of the displayed image is performed at continuous power in response to the size of a gap between the two fingers which was widened or narrowed by the operator on the touchpad 20.

Specifically, in the processing of step S822 to S824, the control signal, creating section 56 creates a control signal in response to the two actuating signals on the basis of the actuating signal indicating that the mouse 18 selected the line 42 and the actuating signal in response to the operation of two fingers on the touchpad 20.

More particularly, in the case where the operator widened a cap between the two fingers placed on the touchpad 20, the actuating signal receiving section 52 receives an actuating signal indicating that a gap between the two fingers was widened in the state where the two fingers contacted on the touchpad 20, and the received actuating signal is stored in the actuating signal storing section 54.

Then, on the basis of the stored actuating signal (that is, the actuating signal indicating that the mouse 18 selected the line 42 and the actuating signal indicating that a gap between the two fingers was widened in the state where the two fingers contacted on the to touchpad 20), the control signal creating section 56 creates a control signal for acquiring a coordinate value of the line 42 and displaying the displayed image displayed on the display screen of the display device 16 in an enlarged manner in response to a widened amount of a gap between the two fingers by using a position indicated by the acquired coordinate value of the line 42 as the center.

After that, the control signal sending section 58 sends the created control signal to the display device control section 60, and the display device control section 60 controls the display device 16 so as to acquire a coordinate value of the line 42 by the displayed image information acquisition section 60a and display the displayed image displayed on the display screen of the display device 16 in an enlarged manner in response to a widened amount of a gap between the two fingers by using a position indicated by the acquired coordinate value of the line 42 as the center by the displayed image information changing section 60b.

Further, in the case where the operator narrowed a gap between the two fingers on the touchpad 20, the actuating signal receiving section 52 receives an actuating signal indicating that a gap between the two fingers was narrowed in the state where the two fingers contacted on the touchpad 20, and the received actuating signal is stored in the actuating signal storing section 54.

Then, on the basis of the stored actuating signal (that is, the actuating signal indicating that the mouse 18 selected the line 42 and the actuating signal indicating that a gap between the two fingers was narrowed in the state were the two fingers contacted on the touchpad 20), the control signal creating section 56 creates a control signal for acquiring a coordinate value of the line 42 and displaying the displayed image displayed on the display screen of the display device 16 in a reduced manner in response to a narrowed amount of a gap between the two fingers by using a position indicated by the acquired coordinate value of the line 42 as the center.

After that, the control signal sending section 58 sends the created control signal to the display device control section 60, and the display device control section 60 controls the display device 16 so as to acquire a coordinate value of the line 42 by the displayed image information acquisition section 60a and display the displayed image displayed on the display screen of the display device 16 in a reduced manner in response to a narrowed amount of a gap between the two fingers by using a position indicated by the acquired coordinate value of the line 42 as the center by the displayed image information changing section 60b.

Further, in the case where the operator moved two fingers together in an arbitrary direction on the touchpad 20, the actuating signal receiving section 52 receives an actuating signal indicating that the two fingers were moved together in a predetermined direction in the state were the two fingers contacted on the touchpad 20, and the receiver actuating signal is stored in the actuating signal storing section 54.

Then, on the basis of the stored actuating signal (that is, the actuating signal indicating that the mouse 18 selected the line 42 and the actuating signal indicating that the two fingers were moved together in a predetermined direction in the state where the two fingers contacted on the touchpad 20), the control signal creating section 56 creates a control signal for acquiring a coordinate value of the line 42 and panning the displayed image displayed on the display screen of the display device 16 in a direction where the two fingers were moved together in the state where a position indicated by the acquired coordinate value of the line 42 is displayed.

After that, the control signal sending section 58 sends the created control signal to the display device control section 60, and the display device control section 60 controls the display device 16 so as to acquire a coordinate value of the line 42 by the displayed image information acquisition section 60a and perform panning in a predetermined direction within a range where a position indicated by the acquired coordinate value of the line 42 is displayed on the display screen is panned by the displayed image information changing section 60b.

Then, as the operator releases the two fingers from the surface of the touchpad 20 (step S826), the fact that the operator released the two fingers from the touchpad 20 is detected, the two pointers displayed on the operation panel 40 are deleted, and the menu items of "arc", "radius" and "instruction method" are displayed on the operation panel 40 again (step S828).

Specifically, in the processing of step S826 to S828, as the operator releases the two fingers from the surface of the touchpad 20, the actuating signal receiving section 52 receives an actuating signal indicating that the two fingers were released from the surface of the touchpad 20, and the received actuating signal is stored in the actuating signal storing section 54.

Then, on the basis of the stored actuating signal (that is, the actuating signal indicating that the menu item of "manual wiring" displayed on the operation panel 40 was selected by the touchpad 20 and the actuating signal indicating that the two fingers were released from the surface of the touchpad 20), the control signal creating section 56 creates a control signal for deleting the two pointers displayed on the operation panel 40, creates a control signal for displaying the menu items of "arc", "radius" and "instruction method" on the operation panel 40 again, and the control signal sending section 58 sends the created control signal to the display device control section 60.

And then, the display device control section 60 controls the display device 16 so as to delete the two pointers displayed on the operation panel 40 by the displayed image information changing section 60b, and display the menu items of "arc", "radius" and "instruction method" on the operation panel 40 after that.

Figure 9D:
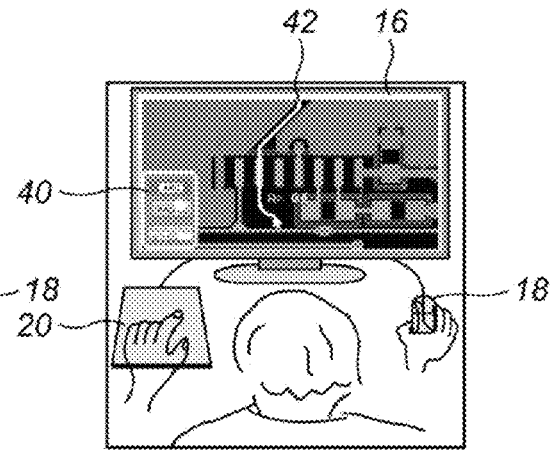
FIG. 9(d) is an explanatory view for showing the state where manual wiring is executed.

Next, as shown in FIG. 9(d), the operator draws a wiring of a desired shape from the line 42 by using the mouse 18 (step S830).

Figure 10:
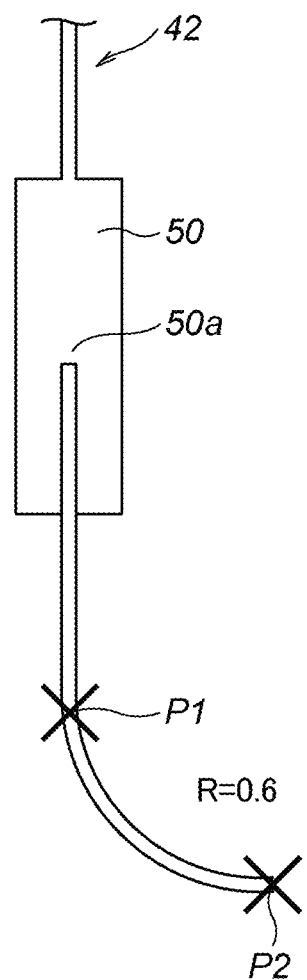
FIG. 10 is an explanatory view for specifically explaining the manual wiring in the line.

Regarding the processing of such step S830, referring to FIG. 10, a case where a rubber band indicating an unfinished net is selected and wired from a terminal 50 provided for the line 42 will be specifically explained as an example.

First, the operator selects a rubber band (not shown) indicating an unfinished net, which is displayed when manual wiring is selected from the menu items on the operation panel 40, by the mouse 18, for example. Then, a mode of drawing a straight line pattern from the central portion 50a of the terminal 50 provided for the line 42 appears, in which the operator positions the pointer corresponding to the mouse 18 at point P1 which is an end point when drawing the straight line from the central portion 50a of the terminal 50 while clicking a button 18a to determine a range of drawing a straight line from the central portion 50a of the terminal 50, and a linear line is drawn from the central portion 50a of the terminal 50 to point P1.

Specifically, in the above-described processing, as the operator selects the rubber band (not shown) indicating the unfinished net, which is displayed when manual wiring is selected from the menu items on the operation panel 40, by the mouse 18, the actuating signal receiving section 52 receives an actuating signal indicating that the rubber band (not shown) indicating the unfinished net, which is displayed on the displayed image was selected by the mouse 18, and the received actuating signal is stored in the actuating signal storing section 54.

Then, on the basis of the stored actuating signal, the control signal creating section 56 creates a control signal for forming the mode of drawing a straight line pattern from the central portion 50a of the terminal 50 provided for the line 42, and the control signal sending section 58 sends the created control signal to the display device control section 60.

And then, the display device control section 60 controls the display device 16 so as to form the mode of drawing a straight line pattern from the central portion 50a of the terminal 50 by the displayed image information changing section 60b.

After that, as the operator determines point P that is the end point, for drawing a straight line by the mouse 18, the actuating signal receiving section 52 receives an actuating signal indicating that P1 being the end point for drawing the straight line by the mouse 18 was determined, and the received actuating signal is stored in the actuating signal storing section 54.

Then, on the basis of the stored actuating signal, the control signal creating section 56 creates a control signal for drawing the linear line from the central portion 50a of the terminal. 50 to point 21, and the control signal sending section 58 sends the created control signal to the display device control section 60.

And then, the display device control section 60 controls the display device 16 so as to drama linear line from the central portion 50a of the terminal 50 to point P1 by the displayed image information changing section 60b.

Next, the operator operates the touch panel 20 to select "arc" from the menu items displayed on the operation panel 40. Then, the mode of drawing the straight line pattern is changed to a mode of drawing the arc pattern, and a numerical value of the previously set radius of the arc is displayed. It is to be noted that the numerical value displayed as a radius can be changed from the keyboard of the character input device 22 as needed by the operator by operating the touch panel 20 to select "radius" from the menu items displayed on the operation panel 40.

Then, the pointer corresponding to the mouse 18 is positioned at point P2 which is an end point for drawing an arc pattern from point P1 and the button 18a is clicked, a range of drawing an arc pattern from point P1 is determined, and an arc-like line is drawn from point P1 to point 22. After that, the mode of drawing a straight line appears again, and the operator repeats such operations to form the pattern into a desired shape.

Specifically, in the above-described processing, as the operator operates the touch panel 20 to select "arc" from the menu items displayed on the operation panel 40, the actuating signal receiving section 52 receives an actuating signal indicating that the menu item "arc" displayed on the operation panel 40 was selected by the touchpad 20, and the received actuating signal is stored in the actuating signal storing section 54.

Then, on the basis of the stored actuating signal, the control signal creating section 56 creates a control signal for changing to the mode of drawing an arc pattern from point P1, and the control signal sending section 58 sends the created control signal to the display device control section 60.

And then, the display device control section 60 controls the display device 16 so as to make the mode of drawing the arc pattern from point P1 by the displayed image information changing section 60b.

Herein, in the case of changing a radius of the arc pattern, as the operator inputs a predetermined numerical value by using the keyboard of the character input device 22, the actuating signal receiving section 52 receives an actuating signal indicting that a predetermined numerical value was inputted by the keyboard of the character input device 22, and the received actuating signal iso stored in the actuating signal storing section 54.

Then, on the basis of the stored actuating signal, the control signal creating section 56 creates a control signal by which an arc having the inputted numerical value as a radius can be drawn, and the control signal sending section 58 sends the created control signal to the display device control section 60.

And then, the display device control section 60 controls the display device 16 so as to enable the device to draw an arc pattern having the numerical value inputted from point P1 as a radius by the displayed image information changing section 60b.

Then, the operator determines point P being an end point for drawing the arc pattern by the mouse 18, the actuating signal receiving section 52 receives an actuating signal indicating that P2 being an end point for drawing the arc pattern from point P1 by the mouse 18 was determined, and the received actuating signal is stored in the actuating signal storing section 54.

Next, on the basis of the stored actuating signal, the control signal creating section 56 creates a control signal for drawing an arc-like line between point. P1 and point P2, and the control signal sending section 58 sends the created control signal to the display device control section 60.

And then, the display device control section. 60 controls the display device 16 so as to draw an arc-like line from point P1 to point P2 by the displayed image information changing section 60b.

It is to be noted that the processing of step S820 to step S830 correspond to the processing of step S536.

Then, the line drawn by the processing of step S830 is stored in the storage device 14 (S832: corresponding to the processing of step S538).

3. Case of Selecting a Mounted Component as an Object (Specific Example Regarding the Processing Step S524 to Step S538)

In the case where the mounted component is selected as an object as a processing of executing a menu showing the most suitable processing contents for the selected object, the operator selects the mounted component 44 in the displayed image displayed on the display screen of the display device 16 first by using the mouse 18 (S1102: corresponding to the above-described processing of step S508) in the state where the initialization of the information of the mouse in the storage device 14 ended (state where a processing corresponding to the processing of step S502 to step S506 ended).

And then, the fact that the operator selected the mounted component 44 by the mouse 18 is detected, and the selected mounted component 44 is stored in the storage device 14 (step S1104: corresponding to the processing of step S510).

Specifically, in the processing of step S1104, the actuating signal receiving section 52 receives an actuating signal indicating that the mouse 18 selected the mounted component 44, and the received actuating signal is stored in the actuating signal storing section 54.

Figure 13A:
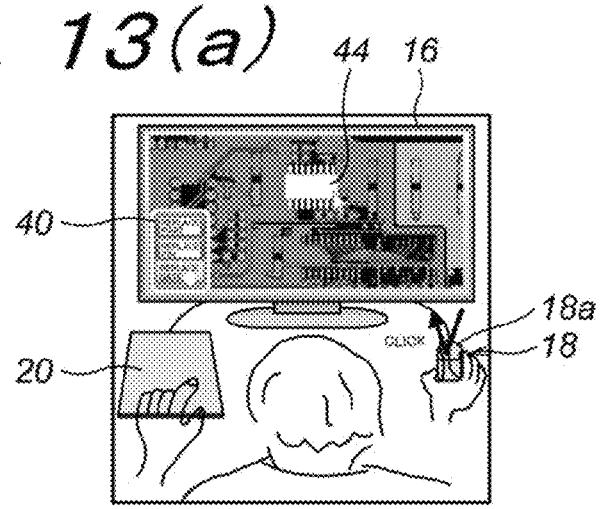
FIG. 13(a) is an explanatory view for showing the state where a mounted component which is selected is displayed in white color in a displayed image and the state of displaying an operation panel that displays the menu showing the most suitable processing content for the mounted component which was selected on the display screen.

Then, from a detection result that was detected and stored by the processing of step S1104, it is judged that the operator selected the mounted component 44 by using the mouse 18 (step S1106: corresponding to the processing of step S512), and as shown in FIG. 13(a), the mounted component 44 stored in the storage device 14 in the processing of step S1104 is displayed in white color in the displayed image (step S1108: corresponding to the above-described processing of step S524).

Specifically, in the processing of steps S1106 to S1108, the control signal creating section 56 judges that the actuating signal stored in the actuating signal storing section 54 is the actuating signal indicating that the mouse 18 selected the mounted component 44, creates a control signal for displaying the mounted component 44 in white color in the displayed image, and the control signal sending section 58 sends the created control signal to the display device control section 60.

Then, the display device control section 60 controls the display device 16 so as to display the mounted component 44 in white color by the displayed image information changing section 60b.

After that, the operator touches the touchpad 20 with only one finger (step S1110: corresponding to the processing of step S526).

At this point, the fact that the operator touched the touchpad 20 with only one finger is detected, and as shown in FIG. 13(a), an operation panel corresponding to the touchpad 20 is displayed at a predetermined position on the display screen of the display device 16 and the menu items of "replace part", "replace pin" and "replace gate" which are the most suitable processing contents in the mounted component 44 stored in the storage device 14 in the processing of step S1104 are displayed on the operation panel 40 (step S1112: corresponding to the above-described processing of step S528 and step S530).

Specifically, in the processing of step S1110 to S1112, as the operator touches the touchpad 20 with only one finger, the actuating signal receiving section 52 receives an actuating signal indicating that only one finger touched the touchpad 20, and the received actuating signal is stored in the actuating signal storing section 54.

Then, the control signal creating section 56, from the actuating signal indicating that the mouse 18 selected the mounted component. 44 and the actuating signal indicating that only one finger touched the touchpad 20, creates a control signal for displaying the operation panel 40 corresponding to the touchpad 20 at a predetermined position on the display screen of the display device 16 and displaying the menu items of "replace part", "replace pin" and "replace gate" on the display panel 40, and the control signal sending section 58 sends the created control signal to the display device control section 60.

And then, the display device control section 60 controls the display device 16 so as to display the operation panel 40 at a predetermined position on the display screen and displaying the menu items of "replace part", "replace pin" and "replace gate" on the operation panel 40 on the basis of the sent control signal by the displayed image information changing section 60b.

Next, the operator determines a processing to be performed to the mounted component 44. At this point, the operator selects any one out of the menu items displayed on the operation panel 40 by using the touchpad 20 to determine to perform a processing described in the menu item or determine to perform a processing of moving the mounted component 44 by placing the pointer corresponding to the mouse 18 to the mounted component 44 while keeping on pressing the button. 18a of the mouse 18 (step S1114: corresponding to the above-described processing of step S532).

Specifically, in the processing of step S1114, the actuating signal receiving section 52 receives an actuating signal indicating that "replace part" (or "replace pin", "replace gate") displayed on the operation panel 40 was selected by the touchpad 20, or an actuating signal indicating that the pointer was placed to the mounted component 44 by the mouse 18 while the button 18a of the mouse 18 was kept on being pressed, that is, the mounted component 44 was set to a movable state by the mouse 18, and the received actuating signal is stored in the actuating signal storing section 54.

In the processing of step S1114, in the case where the operator selected any one of "replace part", "replace pin" and "replace gate" from the menu items displayed on the operation panel 40 by using the touchpad 20, a selected replacement processing is performed to the mounted component 44 (step S1116).

It is to be noted that detail contents for replace part, replace pin, and replace gate will be omitted because they are widely known technique implementable by a general electrical CAD system.

Specifically, in the processing of step S1116, as an actuating signal indicating that "replace part" (or "replace pin", "replace gate"), which was displayed on the operation panel 40 was selected by the touchpad 20, is stored in the actuating signal storing section 54 in the processing of step S1114, the control signal creating section 56, on the basis of the actuating signal indicating that "replace part" (or "replace pin", "replace gate") displayed on the operation panel 40 was selected by the touchpad 20, creates a control signal for executing the selected processing to the mounted component 44, and the control signal sending section 58 sends the created control signal to the display device control section 60.

And then, the display device control section 60 controls the display device 16 so as to execute the processing of "replace part" (or "replace pin", "replace gate"), which was selected to the mounted component 44, by the displayed image information changing section 60b.

Figure 13B:
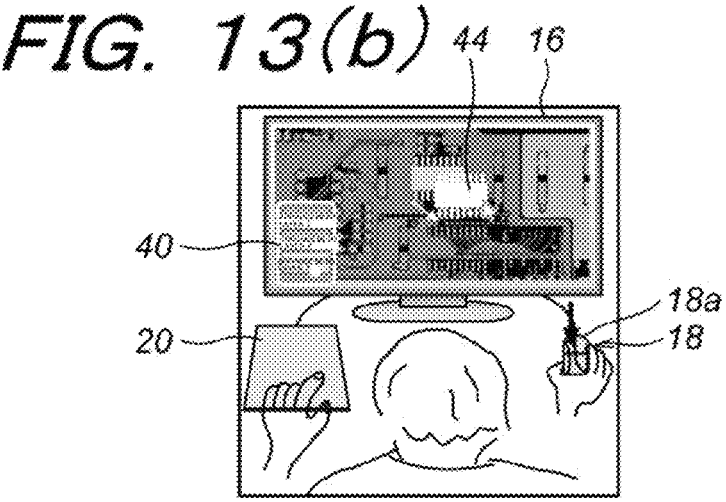
FIG. 13(b) is an explanatory view for showing the state of displaying an operation panel that displays a menu showing a processing content in the state where a pointer corresponding to a mouse is placed to the mounted component on the display screen while a mouse button is kept on being pressed.

On the other hand, in the processing of step S1114, in the case where the operator placed the pointer corresponding to the mouse 18 to the mounted component 44 while keeping on pressing the button 18a of the mouse 18, and determined to move the mounted component 44, the fact that the pointer corresponding to the mouse 18 was placed to the mounted component 44 and the button 18a of the mouse 18 was kept on being pressed is detected. Then, the menu items displayed on the operation panel 40 are deleted, and as shown in FIG. 13(b), menu items of "arrangement layer 1", "arrangement layer 2" and "arrangement layer 3" are displayed on the operation panel 40 (step S1202: corresponding to the above-described processing of step S534).

Specifically, in the processing of step S1202, as the actuating signal indicating that the mounted component 44 was set to a movable state by the mouse 18 is stored in the actuating signal storing section 54 in the processing of step S1114, the control signal creating section 56, on the basis of the actuating signal indicating that the mounted component 44 was set to a movable state by the mouse 18, creates a control signal for setting the movable state by the mouse 18, and creates a control signal for deleting the menu items of "replace part", "replace pin" and "replace gate" displayed on the operation panel 40 and displaying the menu items of "arrangement layer 1", "arrangement layer 2" and "arrangement layer 3" on the operation panel 40, and the control signal sending section 58 sends the created control signal to the display device control section 60.

And then, the display device control section 60 controls the display device 16 so as to set the mounted component 44 to a movable state, and delete the menu items of "replace part", "replace pin" and "replace gate" displayed on the operation panel 40 and display the menu items of "arrangement layer 1", "arrangement layer 2" and "arrangement layer 3" on the operation panel 40, by the displayed image information changing section 60b.

Next, in the state where the operator placed the pointer corresponding to the mouse 18 to the mounted component 44 while keeping on pressing the button 18a of the mouse 18, he/she places two fingers on the touchpad 20 (step S1204).

Figure 13C:
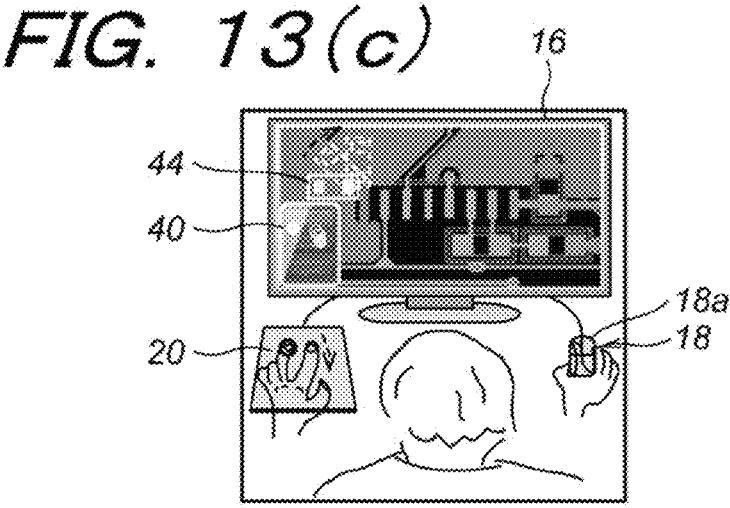
FIG. 13(c) is an explanatory view for showing the state where the operator rotates the mounted component selected by the touchpad.

And then, the fact that the operator placed the two fingers on the touchpad 20 is detected, the menu items displayed on the operation panel 40 are deleted, and as shown in FIG. 13(c), two pointers associated with positions at which the two fingers on the touchpad 20 are placed are displayed on the operation panel 40 (step S1206).

Specifically, in the processing of step S1204 to S1206, as the operator places two fingers on the touchpad 20 in the state where he/she placed the pointer corresponding to the mouse 18 to the mounted component 44 while keeping on pressing the button 18a of the mouse 18, the actuating signal receiving section 52 receives an actuating signal indicating that the two fingers were placed on the touchpad 20 in the state where the pointer corresponding to the mouse 18 was placed to the mounted component 44 while the button 18a of the mouse 18 was kept on being pressed, and the received actuating signal is stored in the actuating signal storing section 54.

Then, on the basis of the stored actuating signal, the control signal creating section. 56 creates a control signal for deleting the menu items of "arrangement layer 1", "arrangement layer 2" and "arrangement layer 3" displayed on the operation panel 40 and displaying the two pointers associated with positions at which the two fingers on the touchpad 20 are placed on the operation panel 40.

After that, the control signal sending section 58 sends the created control signal to the display device control section 60, and the display device control section 60 controls the display device 16 so as to delete the menu items of "arrangement layer 1", "arrangement layer 2" and "arrangement layer 3" displayed on the operation panel 40 and display the two pointers associated with positions at which the two fingers on the touchpad 20 are placed on the operation panel 40, by the displayed image information changing section 60b.

Then, the operator operates the two pointers displayed on the operation panel 40 by two fingers placed on the touchpad 20 (step S1208).

In short, the operator, in the state where the two fingers contacted on the touchpad 20, fixes one finger of the two fingers on the touchpad 20 and moves the other finger in a direction where the mounted component 44 needs to be rotated, by which the mounted component 44 in the displayed image is rotated in a desired direction.

At this point, a display state of the displayed image displayed on the display screen of the display device 16 is changed in response to the operation of the operator by the processing of step S1208 (step S1210).

Now, in rotating such a mounted component 44, rotation of the mounted component 44 in the displayed image is performed in response to an action amount of the finger that the operator rotated on the touchpad 20.

Specifically, in the processing of step S1208 to S1210, as the operator fixes one finger of the two fingers on the touchpad 20 in the state where the two fingers contacted on the touchpad 20, and moves the other finger in a direction where the mounted component 44 needs to be rotated, the actuating signal receiving section 52 receives an actuating signal indicating that one of the two fingers was fixed and the other finger was moved in a predetermined direction in the state where the two fingers contacted on the touchpad 20 on the touchpad 20, and the received actuating signal is stored in the actuating signal storing section 54.

Then, on the basis of the stored actuating signal, a control signal for rotating the mounted component 44 in the displayed image in a direction where the other finger was moved in response to the moved amount of the other finger is created, and the control signal sending section 58 sends the created control signal to the display device control section 60.

And then, the display device control section 60 controls the display device 16 so as to rotate the mounted component 44 in the displayed image in the direction where the other finger was moved in response to the moved amount of the other finger by the displayed image information changing section 60b.

Then, as the operator releases the two fingers from the surface of the touchpad 20 (step S1212), the fact that the operator released the two fingers from the touchpad 20 is detected, the two pointers displayed on the operation panel 40 are deleted, and the menu items of "arrangement layer 1", "arrangement layer 2" and "arrangement layer 3" are displayed on the operation panel 40 again (step S1214).

Specifically, in the processing of step S1214, as the operator releases the two fingers from the surface of the touchpad 20, the actuating signal receiving section 52 receives an actuating signal indicating that the two fingers were released from the surface of the touchpad 20, and the received actuating signal is stored in the actuating signal storing section 54.

Then, on the basis of the stored actuating signal (that is, the actuating signal indicating that the mounted component 44 was set to a movable state by the mouse 18 and the actuating signal indicating that the two fingers were released from the surface of the touchpad 20), the control signal creating section 56 creates a control signal for deleting the two pointers displayed on the operation panel 40 and creates a control signal for displaying the menu items of "arrangement layer 1", "arrangement layer 2" and "arrangement layer 3" on the operation panel 40 again, and the control signal sending section 58 sends the created control signal to the display device control section 60.

And then, the display device control section 60 controls the display device 16 so as to delete the two pointers displayed on the operation panel 40, and then, display the menu items of "arrangement layer 1", "arrangement layer 2" and "arrangement layer 3" on the operation panel 40, by the displayed image information changing section 60b.

After that, in the state where the mounted component 44 is rotated, the mounted component 44 is moved to a desired position while the operator selects the menu item displayed on the operation panel 40 by using the touchpad 20 (step S1216).

In short, in the processing of step S1216, the operator, by selecting a menu item displayed on the operation panel 40 by using the touchpad 20, changes the displayed image on the display screen to the displayed image in the selected layer while moving the mouse 18 and keeping on pressing the button 18a, by which the mounted component 44 is moved in the displayed image, and an arranging position of the mounted component 44 is determined.

It is to be noted that the processing of step S1204 to S1216 corresponds to the above-described processing of step S536.

Then, on the displayed image, the mounted component 44 moved in the processing of step S1216 is arranged in an arrangement layer which was selected from the menu items displayed on operation panel, and the contents of moving and arranging the mounted component 44 are stored in the storage device 14 (step S1218: corresponding to the above-described processing of step S538).

Specifically, in the processing of step S1216 to S1218, the actuating signal receiving section 52 receives an actuating signal indicating that the mounted component 44 was moved by the mouse 18, and the actuating signal receiving section 52 receives an actuating signal indicating that "arrangement layer 1" (or "arrangement layer 2", "arrangement layer 3") of the menu items displayed on the operation panel 40 was selected by the touchpad 20, and the received actuating signal is stored in the actuating signal storing section 54.

Then, on the basis of the stored actuating signals (that is, the actuating, signal indicating that the mounted component 44 was moved by the mouse 18 and the actuating signal indicating that "arrangement layer 1" (or "arrangement layer 2", "arrangement layer 3") of the menu items displayed on the operation panel 40 was selected by the touchpad 20), the control signal creating section 56 creates a control signal for moving the mounted component 44 in response to a moved amount of the mouse 18 and changing the displayed image to "arrangement layer 1" for "arrangement layer 2", "arrangement layer 3"), and the control signal sending section 58 sends the created control signal to the display device control section 60.

And then, the display device control section 60 controls the display device 16 so as to move the mounted component 44 in response to a moved amount of the mouse 18 and change the image displayed in arrangement layer 1 for arrangement layer 2, arrangement layer 3) by the displayed image information changing section 60b.

As explained above, in the electrical design CAD system 100 equipped with the input information processing system according to the present invention, selection of an object or drawing of a line in the displayed image displayed on the display screen of the display device 16 is performed by the mouse 18 being a pointing device operated by the dominant hand of the operator, an operation in the operation panel 40 which is displayed at a predetermined position on the display screen of the display device 16 and whose displayed contents are changed depending on the number of fingers touched or placed on the touchpad 20 or an operating state of the mouse 18, is performed by the touchpad 20 being a pointing device operated by the non-dominant hand of the operator.

In short, the operation panel. 40 that is operated by the touchpad 20 and designates processing contents conducted to the target object is displayed in a predetermined region on the display screen, which is a region in which the pointer corresponding to the mouse 18 that designates a target object to be processed is movable, and designation of the target object and designation of the processing contents to be executed to the target object can be executed on different display regions by using different pointing devices.

Further, as the operator widens/narrows a gap between the two fingers placed on the touchpad 20, a coordinate value of the selected object or the pointer corresponding to the mouse 18 in the displayed image is acquired, and the displayed image is enlarged/reduced by using a position indicated by the coordinate value as the center.

Specifically, in the electrical design CAD system 100 equipped with the input information processing system according to the present invention, enlarging/reducing display and menu operation can be performed in the state were a display position of a target point, that is, the pointer corresponding to the mouse 18 or the selected object on the display screen of the display device 16 is not changed but fixed.

Therefore, in the electrical design CAD system 100 equipped with the input information processing system according to the present invention, the operator is enabled to perform an executable processing and select a processing without losing sight of the target point, and work is not interrupted.

Furthermore, in the electrical design CAD system 100 equipped with the input information processing system according to the present invention, an operation is performed by using both hands of the operator and a more efficient operation can be performed when the non-dominant hand uses the touchpad 20 whose operation is easier.

It is to be noted that the above-described embodiment may be modified as shown in (1) to (20) below.

(1) in the embodiment described above, the dominant hand of the operator operated the mouse 18 being a pointing device, and the non-dominant hand of the operator operated the touchpad 20 being a pointing device, but it goes without saying that the invention is not limited to this. For example, a trackball, a joystick, a touchpad or the like can be used as a pointing device operated by the dominant hand of the operator, and a data globe or the like for example may also be used as a pointing device operated by the non-dominant hand of the operator.

Specifically, combination of pointing devices is not limited to the combination explained above. For an operator who can use both hands skillfully, combination of pointing devices in right hand and left hand is arbitrary.

(2) In the embodiment described above, in the case where two fingers were placed on the touchpad 20, the menu items displayed on the operation panel 40 before the fingers were placed were deleted, two pointers associated with positions at which two fingers on the touchpad 20 were placed were displayed, but it goes without saying that the invention is not limited to this. For example, instead of deleting the menu items displayed on the operation panel 40 before the fingers were placed, display on the operation panel 40 may be grayed out, and two pointers associated with positions at which the two fingers on the touchpad 20 were placed may be displayed. At this point, gray out display on the operation panel 40 is cancelled by releasing the two fingers of the operator from the surface of the touchpad 20.

(3) In the embodiment described above, enlarging, reducing and panning were performed to change a display state of the displayed image in the processing of step S612 to step S620 and the processing of step S818 to step S826, but it goes without saying that the processing may be omitted in the case where such operations are not needed.

(4) In the embodiment described above, the mounted component 44 was rotated in the processing of step S1204 to step S1212, but it goes without saying that the processing may be omitted in the case where such an operation is not needed.

(5) In the embodiment described above explained the case of using two pointing devices that are the mouse 18 and the touchpad 20, but it goes without saying that the invention is not limited to this. For example, three pointing devices that are a pointing device which is operated by installing on the head of an operator, the mouse 18 and the touchpad 20 may be used.

(6) In the embodiment described above, three menu items were displayed on the operation panel 40, but it goes without saying that three or more menu items may be displayed. In the case where menu items are too many to be fully displayed in the window of the operation panel 40, for example, the operator places three fingers on the touchpad 20, by which the fact that three fingers were placed on the touchpad 20 by the operator is detected, three pointers associated with positions at which the three fingers on the touchpad 20 are placed are displayed on the operation panel 40, the operator moves the three fingers together vertically in the state where the three fingers touched on the touchpad 20, by which the menu items on the operation panel 40 may be allowed to be scrolled vertically in conjunction with the movement of the operator's fingers (refer to FIG. 14(*a*)).

Specifically, as the operator places three fingers on the touchpad 20, the actuating signal receiving section 52 receives an actuating signal indicating that the three fingers were placed on the touchpad 20, and the received actuating signal is stored in the actuating signal storing section 54.

Then, on the basis of the stored actuating signal, the control signal creating section 56 creates a control signal for displaying three pointers associated with positions on the touchpad 20 at which the three fingers were placed, on the menu items displayed on the operation panel 40, and the control signal sending section 58 sends the created control signal to the display device control section 60.

And then, the display device control section 60 controls the display device 16 so as to display the three pointers associated with positions on the touchpad 20 at which three fingers were placed, on the menu items displayed on the operation panel 40 by the displayed image information changing section 60*b*.

After that, in the case where the operator moved the three fingers together up or down in the state where three fingers touched on the touchpad 20, the actuating signal receiving section 52 receives an actuating signal indicating that the three fingers were moved together up or down in the state where the three fingers touched on the touchpad 20, and the received actuating signal is stored in the actuating signal storing section 54.

Then, on the basis of the stored actuating signal, the control signal creating section 56 creates a control signal for scrolling the menu items displayed on the operation panel 40 up or down in response to the action of the three fingers, and the control signal sending section 58 sends the created control signal to the display device control section 60.

And then, the display device control section 60 controls the display device 16 so as to scroll the menu items displayed on the operation panel 40 up or down in response to the action of three fingers by the displayed image information changing section 60*b*.

Then, as the operator releases the three fingers from the surface of the touchpad 20, the actuating signal receiving section 52 receives an actuating signal indicating that the three fingers were released from the surface of the touchpad 20, the received actuating signal is stored in the actuating signal storing section. 54, and the control signal creating section 56 creates a control signal for deleting the three pointers displayed on the operation panel 40 on the basis of the stored actuating signal.

After that, the control signal sending section 58 sends the created control signal to the display device control section 60, and the display device control section 60 controls the display device 16 so as to delete the three pointers displayed on the operation panel 40 by the displayed image information changing section 60*b*.

Figure 14A:
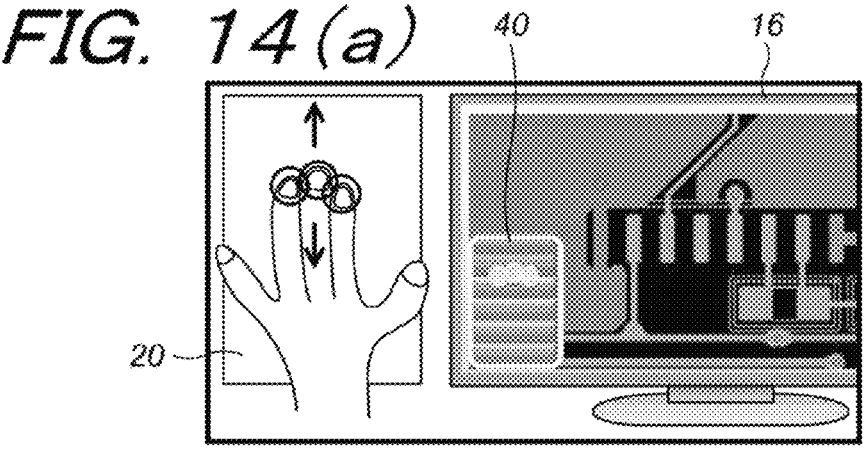
FIG. 14(a) is an explanatory view for showing a method in which a menu item displayed on the operation panel is scrolled by placing three fingers on touchpad. Further.
Figure 14B:
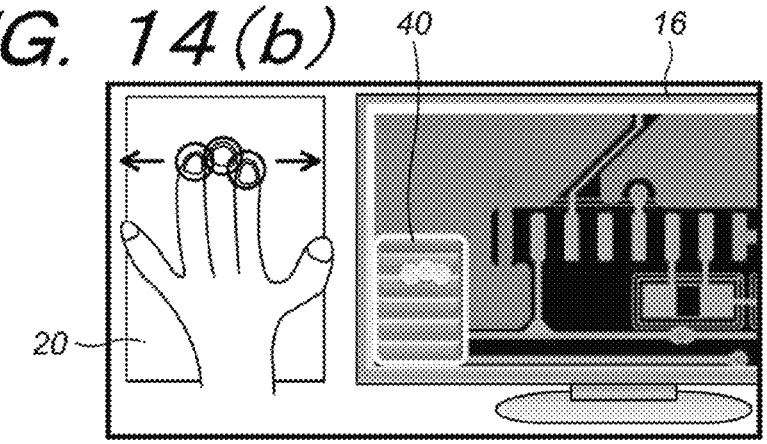
FIG. 14(b) is an explanatory view for showing a method in which a display page of a menu item displayed on the operation panel is switched by placing three fingers on the touchpad.
Figure 14C:
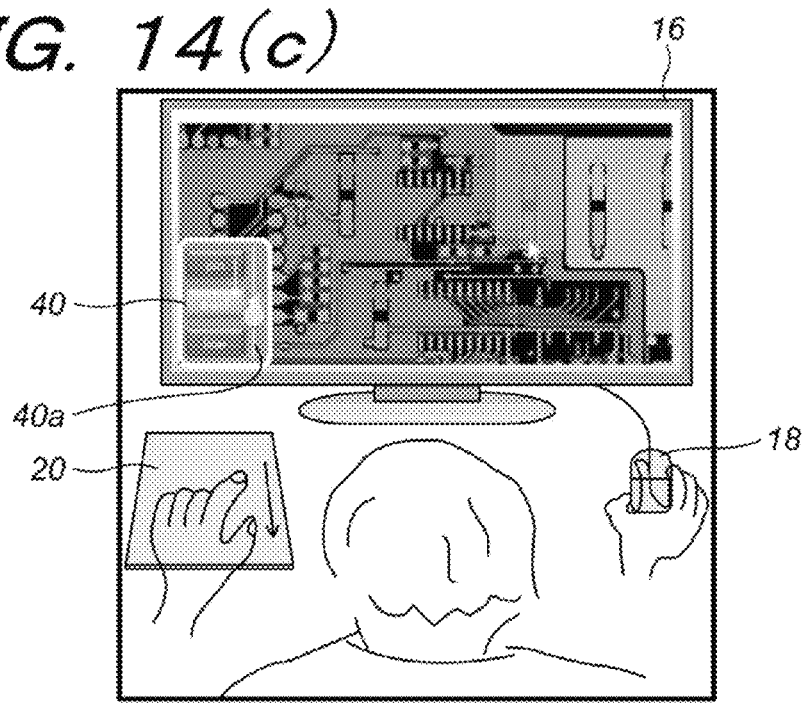
FIG. 14(c) is an explanatory view for showing the state where a sliding bar is displayed on the operation panel displayed on the display screen.

Alternatively, the operator moves three fingers in right and left in the state where the three fingers touched on the touchpad 20, by which a display page of the menu items on the operation panel 40 may be switched (refer to FIG. 14(*b*)).

Further, in the case where menu items are too many to be fully displayed in the window of the operation panel 40 displayed on the display screen, a sliding bar 40*a* is displayed on the operation panel 40, the menu items being displayed may be changed by using the sliding bar 40*a* (refer to FIG. 14(*c*)).

(7) Although not particularly described in the embodiment described above, UNDO (undo) and REDO (redo) may be allowed to be performed in response to moved amount of fingers placed on the touchpad 20.

(8) Although not particularly described in the embodiment described above, a slider capable of changing an RGB value on the display screen on the operation panel 40 is displayed, the operator operates the slider by using the touchpad 20, and the RGB value of an object in the displayed image may be adjusted.

(9) Although not particularly described in the embodiment described above, a color palette is displayed on the operation panel 40, the operator designates an arbitrary color out of the color palette by using the touchpad 20, and a displayed color of an object designated by the mouse 18 on the displayed image may be changed.

(10) The embodiment described above explained the case of selecting the line and the mounted component as an object, but it goes without saying that the object is not limited to them, and a via, a terminal, a land, a plane, a substrate external shape, a casing and the like may be selected as an object.

(11) In the embodiment described above, by electrical design was performed the electrical design CAD system 100 equipped with the input information processing system according to the present invention, but it goes without saying that a plurality of the electrical design CAD systems 100 equipped with the input information processing system according to the present invention may be connected via a network to share design information.

(12) In the embodiment described above, as a processing of executing a general-purpose menu, "fillet" was selected in the case of filleting the line bending part, an area to which the "fillet" processing is executed was selected after display change such as enlarging is done to the displayed image, and a numerical value of the radius R was inputted, but it goes without saying that such a procedure is not limited to this. Display change such as enlarging is done to the displayed image, an area to which the "fillet" processing is executed is selected after selecting "fillet", and a numerical value of the radius R may be inputted.

Furthermore, the numeric keypad displayed on the operation panel 40 was used in inputting a numerical value of the radius R, but it goes without saying that the value may be inputted by using a character input device 18.

(13) In the embodiment described above, in enlarging or reducing the displayed image, enlarging/reducing of the displayed image was performed by continuous power in response to the size of a gap between the two fingers, which is widened or narrowed by the operator on the touchpad 20, but it goes without saying that power for enlarging/reducing the displayed image may be stepwise power.

(14) In the embodiment described above, explanation was given by taking the electrical design CAD system equipped with the input information processing system according to the present invention, as an example, but it goes without saying that the input information processing system according to the present invention may be used for various systems built by a computer system.

(15) In the embodiment described above, as the operator placed two fingers on the touchpad 20, display on the operation panel 40 were temporarily deleted, two pointers associated with positions on the touchpad 20 where the operator's two fingers were placed were displayed on the operation panel 40, the operator operated the two pointers displayed on the operation panel 40 by widening/narrowing a gap between the two fingers placed on the touchpad 20 to perform enlarging or reducing of the displayed image displayed on the display screen of the display device 16, but it goes without saying that the invention is not limited to this.

For example, as the operator places two fingers on the touchpad 20, the operator may widen/narrow a gap between the two fingers placed on the touchpad 20, and perform enlarging or reducing of the displayed image displayed on the display screen of the display device 16 while display on the operation panel 40 is unchanged. In short, in this case, display on the operation panel 40 is unchanged, and the two pointers associated with positions at which the two fingers on the touchpad 20 are placed are not displayed on the operation panel 40, and the operator performs enlarging/reducing of the displayed image by widening/narrowing a gap between the two fingers.

Further, as the operator places two fingers on the touchpad 20, the operation panel 40 are temporarily deleted, the operator expands a gap between the two fingers on the touchpad 20 to perform enlarging or reducing of the displayed image displayed on the display screen of the display device 16, and the operator may display the operation panel 40 again by releasing two fingers from the surface of the touchpad 20. In short, although display on the operation panel 40 is temporarily deleted in this case, the operator performs enlarging/reducing of the displayed image by widening/narrowing a gap between the two fingers without displaying the two pointers associated with positions at which the two fingers on the operation panel 40 and the touchpad 20 are placed.

(16) In the embodiment described above, the pointing device was used as input means, but it goes without saying that the means is not limited to this and various input devices such as a character input device may be used.

(17) in the embodiment described above, the line 42 (that is, one line) and the mounted component 44 (that is, one mounted component) were select as an object by the mouse 18, but it goes without saying that the object is not limited to them and a partial line segment of the line 42 may be selected, or a specific terminal in the mounted component 44 may be selected. Now in the case of selecting only a part of the line 42 or the mounted component 44 in this manner, a line segment, a terminal or the like positioned in a region designated by the mouse 18 should only be selected, for example.

(18) In the embodiment described above, in rotational movement of the mounted component 44, that is, the processing of step S1210 to S1214, after rotating the mounted component 44, the mounted component 44 was dragged and moved by the mouse 18 while the arrangement layer of a moving destination was selected by operating the touchpad 20. In short, after rotating the mounted component 44, the mounted component 44 was moved and arranged to a desired arrangement layer by parallelly using the mouse 18 and the touchpad 20.

Figure 15:
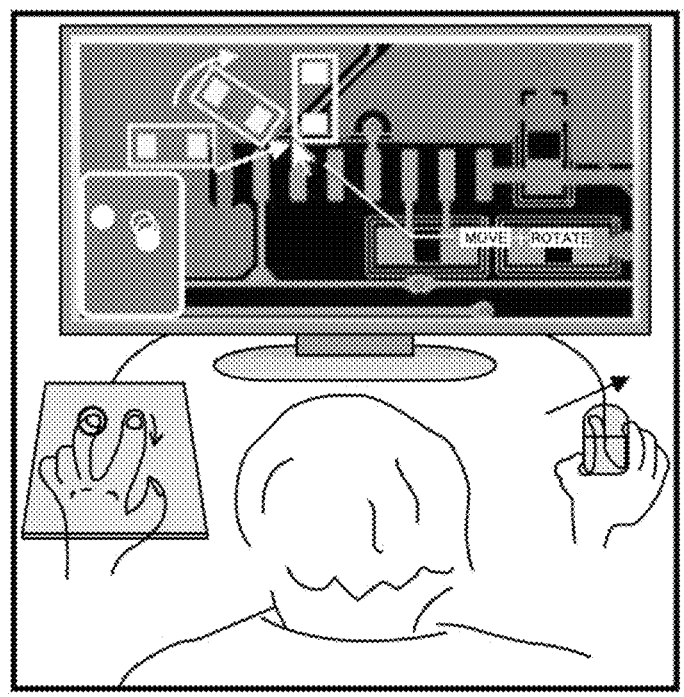
FIG. 15 is an explanatory view for showing the state where the operator moves a part selected by the touchpad while rotating the part.

As parallel use of the mouse 18 and the touchpad 20, the mounted component 44 may be moved while rotating it, by parallelly using the mouse 18 and the touchpad 20, for example (refer to FIG. 15).

In the parallel use of the mouse 18 and the touchpad 20, the CPU 10 performs a synthesizing processing for synthesizing a signal for moving the mounted component 44 which was inputted from the mouse 18, and a signal for rotating the mounted component 44, which was inputted from the touchpad 20, and changes the displayed image displayed on the display screen of the display device 16 on the basis of the synthesized signal synthesized by the synthesizing processing.

Hereinafter, referring to FIG. 16 to FIG. 17, a case where the mounted component 44 is moved while rotating it by parallelly using the mouse 18 and the touchpad 20 will be explained in detail. It is to be noted that the explanation here will be made for the case of moving the mounted component 44 while rotating it in the same arrangement layer for easier understanding.

Figure 16:
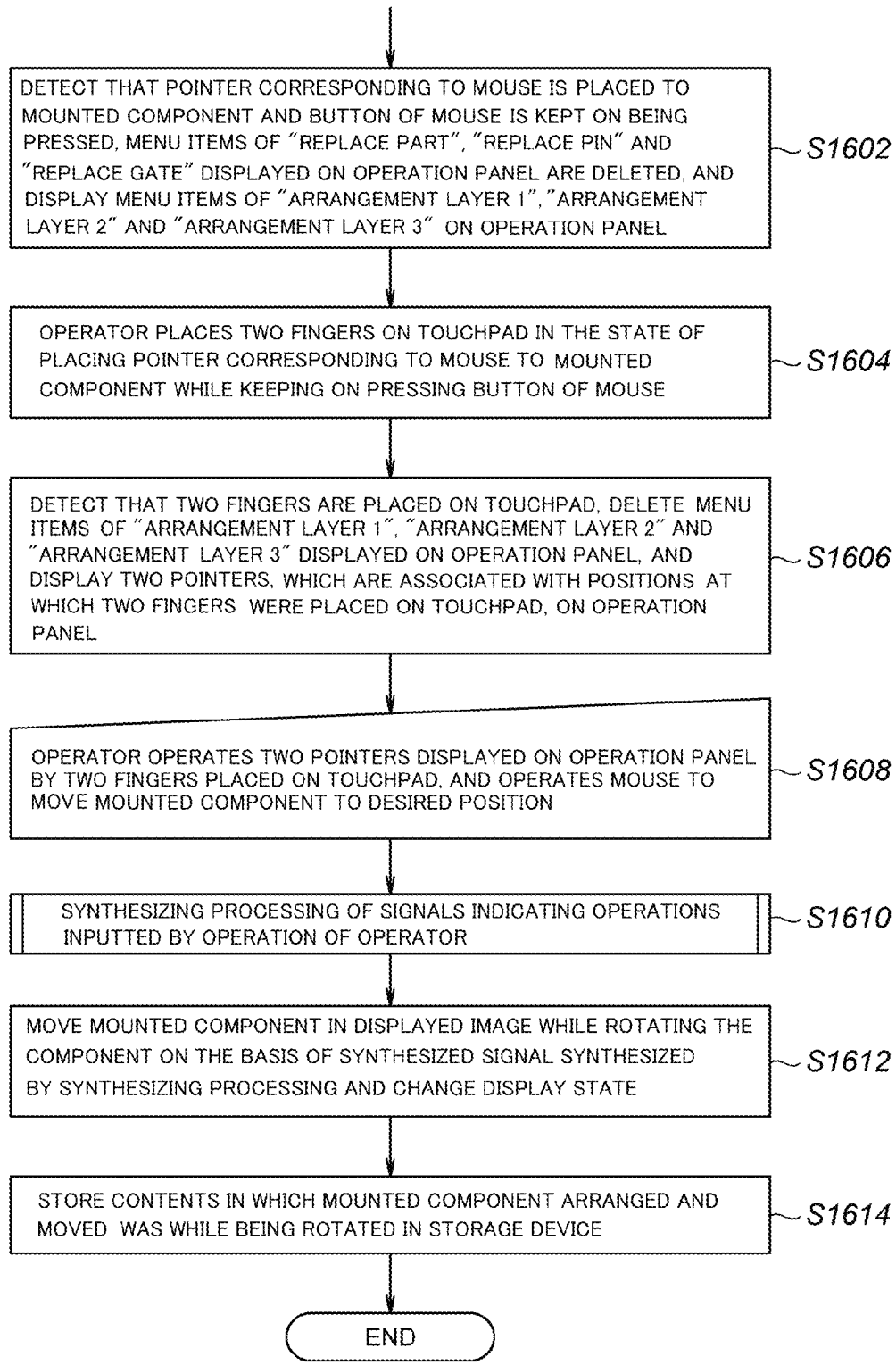
FIG. 16 is a flowchart for showing a processing routine of a processing in which a mounted component is selected as an object and arranging/moving is performed while the selected mounted component is rotated.
Figure 17:
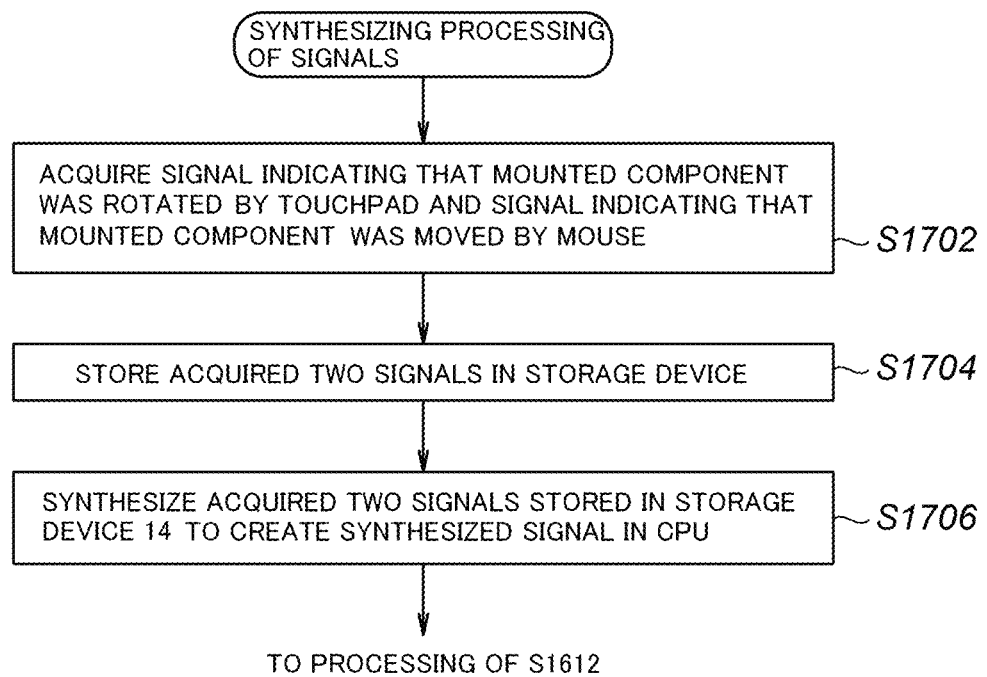
FIG. 17 is a flowchart for showing a processing routine of a synthesizing processing of an inputted actuating signal in which a mouse and a touchpad are used in parallel.

FIG. 16 is a flowchart for showing the processing routine of a processing in which the mounted component is selected as an object and arranging/moving is performed while the selected mounted component is rotated, and FIG. 17 is a flowchart for showing a processing routine of a synthesizing processing for an actuating signal inputted in parallelly using the mouse 18 and the touchpad 20.

In the processing of step S1114, in the case where the operator placed the pointer corresponding to the mouse 18 to the mounted component 44 while keeping on pressing the button 18a of the mouse 18, and determined to move the mounted component 44, the fact that the pointer corresponding to the mouse 18 is placed to the mounted component 44 and the button 18a of the mouse 18 is kept on being pressed, that is, the mounted component 44 was set to a movable state is detected, the menu items displayed on the operation panel 40 are deleted, the menu items of "arrangement layer 1", "arrangement layer 2" and "arrangement layer 3" are displayed on the operation panel 40 (step S1602).

Specifically, in the processing of step S1602, the control signal creating section 56 creates a control signal for setting a movable state by the mouse 18 on the basis of an actuating signal indicating that the mounted component 44 was set to a movable state by the mouse 18, and creates a control signal for deleting the menu items of "replace part", "replace pin" and "replace gate" displayed on the operation panel 40 and displaying the menu items of "arrangement layer 1", "arrangement layer 2" and "arrangement layer 3" on the operation panel 40, and the control signal sending section 58 sends the created control signal to the display device control section 60.

And then, the display device control section 60 controls the display device 16 so as to set the mounted component 44 to a movable state and delete the menu items of "replace part", "replace pin" and "replace gate" displayed on the operation panel 40, and display the menu items of "arrangement layer 1", "arrangement layer 2" and "arrangement layer 3" on the operation panel 40 by the displayed image information changing section 60b.

Next, the operator places two fingers on the touchpad 20 in the state of placing the pointer corresponding to the mouse 18 to the mounted component 44 while keeping on pressing the button 18a of the mouse 18, (step S1604).

And then, the fact that the operator placed the two fingers on the touchpad 20 is detected, the menu items displayed on the operation panel 40 are deleted, and two pointers associated with positions at which the two fingers on the touchpad 20 are placed are displayed on the operation panel 40 (step S1606).

Specifically, in the processing of step S1604 to S1606, as the operator places two fingers on the touchpad 20 in the state of placing the pointer corresponding to the mouse 18 to the mounted component 44 while keeping on pressing the button 18a of the mouse 18, the actuating signal receiving section. 52 receives an actuating signal indicating that the two fingers were placed on the touchpad 20 in the state where the pointer corresponding to the mouse 18 was placed to the mounted component 44 while the button 18a of the mouse 18 was kept on being pressed, and the received actuating signal is stored in the actuating signal storing section 54. Then, on the basis of the stored actuating signal, the control signal creating section 56 creates a control signal for deleting the menu items of "arrangement layer 1", "arrangement layer 2" and "arrangement layer 3" displayed on the operation panel 40 and displaying two pointers associated with positions at which the two fingers on the touchpad 20 are placed on the operation panel 40.

After that, the control signal sending section 58 sends the created control signal to the display device control section 60, and the display device control section 60 controls the display device so as to delete the menu items of "arrangement layer 1", "arrangement layer 2" and "arrangement layer 3" displayed on the operation panel 40 and display two pointers associated with positions at which the two fingers on the touchpad 20 are placed on the operation panel 40 by the displayed image information changing section 60b.

Then, the operator operates the two pointers displayed on the operation panel 40 by the two fingers on the touchpad 20, and operates the mouse 18 to move the mounted component 44 to a desired position (step S1608).

Specifically, the operator, in the state where the two fingers contacted on the touchpad 20, fixes one finger of the two fingers on the touchpad 20, moves the other finger in a direction in which the mounted component 44 needs to be rotated to rotate the mounted component 44 in the displayed image in a desired direction while placing the pointer corresponding to the mouse 18 to the mounted component 44, and moves the mounted component. 44 to a desired position in the state of pressing the button 18a of the mouse 18. In short, in the processing of step S1608, the touchpad 20 is operated to rotate the mounted component 44 while the mounted component 44 is dragged by the mouse 18 to arrange/move the component to a desired position.

Specifically, in the processing of step S1608, as the operator, in the state where the two fingers contacted on the touchpad 20, fixes one finger of the two fingers on the touchpad 20, moves the other finger in a direction in which the mounted component 44 needs to be rotated to rotate the mounted component 44 in the displayed image in a desired direction while placing the pointer corresponding to the mouse 18 to the mounted component 44, and moves the mounted component 44 to a desired position in the state of pressing the button 18a of the mouse 18, the actuating signal receiving section 52 receives an actuating signal indicating that, in the state where the two fingers contacted on the touchpad 20, one finger of the two fingers was fixed on the touchpad 20, the other finger was moved in a desired direction, and the mounted component 44 in the displayed image was rotated in a desired direction, and an actuating signal receiving section 52 receives an actuating signal indicating that the mounted component 44 was moved in the state where the pointer corresponding to the mouse 18 was placed to the mounted component 44 while the button 18a of the mouse 18 was pressed.

Then, the received actuating signal indicating that, in the state where the two fingers contacted on the touchpad 20, one finger of the two fingers was fixed on the touchpad 20, the other finger was moved in a desired direction and the received actuating signal indicating that the mounted component 44 in the displayed image was rotated in a desired direction and the received actuating signal indicating that the mounted component 44 was moved in the state where the pointer corresponding to the mouse 18 was placed to the mounted component 44 while the button 18a of the mouse 18 was pressed are stored in the actuating signal storing section 54.

Next, signals indicating operations inputted by an operation of the operator are synthesized (step S1610). Specifically, the signal indicating that the mounted component 44 was rotated by the touchpad 20 and the signal indicating that the mounted component 44 was moved by the mouse 18 are synthesized.

Herein, the flowchart in FIG. 17 shows detail processing contents of a synthesizing processing of signals indicating operations inputted by operations of the operator in the processing of step S1610, in which as the operator operates the touchpad 20 to rotate the mounted component 44 while operating the mouse 18 to move the mounted component 44, the signal indicating that the mounted component. 44 was rotated by the touchpad 20 the indicating that the mounted component 44 was moved by the mouse 18 are acquired (step S1702), and the acquired two signals are stored in the storage device 14 (step S1704).

Then, the CPU 10 synthesizes the two signals stored in the storage device 14 to produce a synthesized signal (step S1706).

Specifically, in the processing of step S1610 (that is, processing of step S1702 to S1706), on the basis of the actuating signal indicating that one finger of the two fingers was fixed on the touchpad 20, the other finger was moved in a desired direction and the mounted component 44 in the displayed image was rotated in a desired direction, the actuating signal indicating that the mounted component 44 was moved and the actuating signal indicating that the mounted component 44 was moved in the state where the pointer corresponding to the mouse 18 was placed to the mounted component 44 while the button 18a of the mouse 18 was pressed which are stored in the actuating signal storing section 54, the control signal creating section 56 creates a control signal indicating that the mounted component 44 in the displayed image is rotated in a direction where the other finger was moved in response to the moved amount of the other finger while the mounted component 44 is moved in response to a moved amount of the mouse 18.

As the synthesizing processing by the above-described processing of step S1610 is completed, on the basis of the synthesized signal synthesized, the mounted component 44 in the displayed image, which is displayed on the display screen of the display device 16, is moved while rotating it to change a display state (step S1612), contents that the mounted component 44 was rotated while arranging/moving it are stored in the storage device 14 (step S1614).

Specifically, in the processing of step S1614, the control signal sending section 58 sends the control signal created in the control signal creating section 56 to the display device control section 60, and the display device control section 60 controls the display device 16 so as to rotate the mounted component 44 in the displayed image in a direction where the other finger was moved in response to the moved amount of the other finger while moving the mounted component 44 in response to a moved amount of the mouse 18 by the displayed image information changing section 60b.

Now regarding the display on the operation panel 40, by releasing two fingers of the operator from the surface of the touchpad 20, the fact that the operator released the two fingers from the touchpad 20 is detected, and the menu items of "arrangement layer 1", "arrangement layer 2" and "arrangement layer 3" are, displayed after the displayed two pointers are deleted.

As described, in the electrical design CAL) system 100 equipped with the input information processing system according to the present invention, the processing inputted by the mouse 18 and the processing inputted by the touchpad 20 can be parallelly executed.

(19) In the embodiment described above, after the operator touched the touchpad 20 with only one finger, the operation panel 40 was always displayed in a predetermined region displayed on the display screen of the display device 16, but it goes without saying that the display is not limited to this. For example, by double tapping (corresponds to double a mouse) the touchpad 20 with one finger in the state where the operation pad 40 is displayed, the operation panel 40 displayed on the display screen is iconized in the lower left of the display screen of the display device 16, and the iconized operation panel 40 may be displayed again by double tapping the touchpad 20 is double tapped with one finger in the state where the operation panel 40 is iconized.

Consequently, in the case where the target object is hidden by the operation panel 40, the object can be displayed on the display screen by iconizing the operation panel 40.

It is to be noted that the operation panel 40 is not displayed at a predetermined region on the display screen in the state where the operation panel 40 is iconized, so that a pointer or menu items which correspond to the position and movement of fingers on the touchpad 20 are not displayed on the display screen, and in such a state, the operator executes enlarging/reducing of the displayed image displayed on the display screen of the display device 16 by widening/narrowing a gap between the two fingers on the touchpad 20.

(20) The above-described embodiment and modified examples shown in (1) to (19) above may be appropriately combined.

INDUSTRIAL APPLICABILITY

The present invention is preferably used for various systems built by a computer system.

EXPLANATION OF NUMERICAL CHARACTERS

10 CPU
12 Bus
14 Storage device
16 Display device
18 Mouse
20 Touchpad
22 Character input device
24 Input/output interface circuit
26 External storage device
28 Read/write device
30 Recording medium
40 Operation panel.
42 Line
44 Mounted component
50 Input information processing system
52 Actuating signal receiving section
54 Actuating signal storing section
56 Control signal creating section
58 Control signal sending section
60 Display device control section
100 Electrical design CAD system

The invention claimed is:

1. An electrical design CAD system for designing a product comprising a plurality of objects while displaying, on a display screen, at least a part of the plurality of objects, the system comprising:
a first detector configured to detect first input information from a first input device, at least one of the plurality of objects being selected based on the first input information;
a second detector configured to detect second input information from a second input device; and
a controller configured to perform an operation for an image displayed on the display screen, based on the second input information, the operation including one of enlarging, reducing and panning of the image displayed on the display screen,
wherein in a case where at least one of the plurality of objects is selected to edit and the second input device detects, as the second input information, information which requires displaying a menu, the controller displays, on the display screen, a specific menu suitable for editing the selected object,
wherein in a case where none of the plurality of objects is selected to edit and the second input device detects, as the second input information, information which requires displaying a menu, the controller displays, on the display screen, a general-purpose menu, and wherein in a case where the second input device detects, as the second input information, information which requires performing the operation, in a state that the general-purpose menu is displayed on the display screen, the controller performs the operation in accordance with the second input information, then the controller displays another menu after a deactivation of the second input information.

2. The system according to claim 1, wherein the information which requires displaying a menu is created in a case that the second input device is touched with only one finger.

3. The system according to claim 1, wherein when the first detector detects information of a moving operation in which an operator moves the object by the first input device and the second detector simultaneously detects information of a rotating operation in which the operator rotates the object by the second input device, the controller synthesizes information of the moving operation and information of the rotating operation and for simultaneously moving and rotating the object.

4. The system according to claim 1, wherein the first input device is a mouse capable of selecting the object,
wherein the second input device is a touchpad which can be operated by fingers, and wherein the second detector comprises a finger operation detector configured to detect the number of fingers by which the operator touched the touchpad and actions of the fingers.

5. The system according to claim 4, wherein as the finger operation detector detects that the operator touched the touchpad with two fingers and actions of the two fingers, any processing out of enlarging display, reducing display, panning of the object and rotation of the object is executed based on actions of the two fingers.

6. The system according to claim 4, wherein as the finger operation detector detects that the operator touched the touchpad with three fingers and the three fingers moved, the menu is scrolled in a direction where the three fingers moved.

7. The system according to claim 4, wherein the finger operation detector detects the number of fingers by which the operator touched the touchpad and actions of the fingers as finger operation information, and the finger operation information is displayed in a predetermined region on the display screen.

8. A non-transitory computer readable medium having a program stored thereon, that when executed allows a computer to function as the input information processing system according to claim 1.

9. The system according to claim 1, wherein the first input device is a device capable of moving the pointer and capable of selecting or cancelling the selection of the object, and wherein the second input device is a device capable of detecting a finger action of an operator and capable of selecting or cancelling the selection of the object.

10. The system according to claim 1, wherein the controller is configured to display the selected object on the display screen so that the selected object can be identified in the at least one object displayed on the display screen.

11. The apparatus according to claim 1, wherein the general-purpose menu includes a plurality of menu items, and
wherein the operation is performed in a case where the second input device detects the second input information which requires performing the operation, in a state that the general-purpose menu is displayed on the display screen and one of the plurality of menu items of the general-purpose menu is selected.

12. The apparatus according to claim 11, wherein the general-purpose menu is deleted from the display screen before the operation is performed.

13. The apparatus according to claim 11, wherein the second input information which requires displaying a menu is generated when the second input device is touched with only one finger, and the second input information which requires the operation is generated when the second input device is touched with two fingers and actions of the two fingers are detected, and wherein the general-purpose menu is deleted from the display screen when the second input device is touched with two fingers in a state that the general-purpose menu is displayed on the display screen and one of the plurality of menu items of the general-purpose menu is selected.

14. The apparatus according to claim 1, wherein the controller displays the other menu or the keypad in accordance with the first input information which is input after the deactivation of the second input information.

15. A method of designing a product comprising a plurality of objects while displaying, on a display screen, at least a part of the plurality of objects, the method being performed on a computer system and comprising:
  detecting first input information from a first input device, at least one of the plurality of objects being selected based on the first input information;
  detecting second input information from a second input device;
  displaying, on the display screen, a specific menu suitable for editing the selected object in a case where an object of the at least one of the plurality of objects is selected to edit and the second input information requires displaying a menu;
  displaying, on the display screen, a general-purpose menu in a case where none of the plurality of objects is selected to edit and the second input information requires displaying a menu;
  performing an operation for an image displayed on the display screen, in a case where the second input information requires the operation, in a state that the general-purpose menu is displayed on the display screen, the operation including one of enlarging, reducing and panning of the image displayed on the display screen, then displaying another menu after a deactivation of the second input information that requires the operation.

16. The method according to claim 15, further comprising displaying the selected object on the display screen so that the selected object can be identified in the at least one object displayed on the display screen.

17. The method according to claim 15, wherein the general-purpose menu includes a plurality of menu items, and
  wherein the operation is performed in a case where the second input information requires the operation, in a state that the general-purpose menu is displayed on the display screen and one of the plurality of menu items of the general-purpose menu is selected.

18. An electrical design CAD system for designing a product comprising a plurality of objects while displaying, on a display screen, at least a part of the plurality of objects, the system comprising:
  a first detector configured to detect first input information from a first input device, at least one of the plurality of objects being selected based on the first input information;
  a second detector configured to detect second input information from a second input device; and
  a controller configured to perform an operation for an image displayed on the display screen, based on the second input information, the operation including one of enlarging, reducing and panning of the image displayed on the display screen,
  wherein in a case where at least one of the plurality of objects is selected to edit and the second input device detects, as the second input information, information which requires displaying a menu, the controller displays, on the display screen, a specific menu suitable for editing the selected object,
  wherein in a case where none of the plurality of objects is selected to edit and the second input device detects, as the second input information, information which requires displaying a menu, the controller displays, on the display screen, a general-purpose menu, and
  wherein in a case where the second input device detects, as the second input information, information which requires performing the operation, in a state that the general-purpose menu is displayed on the display screen, the controller performs the operation in accordance with the second input information, then the controller displays a keypad in response to an event that at least one of the plurality of objects is selected based on the first input information after a deactivation of the second input information.

19. A method of designing a product comprising a plurality of objects while displaying, on a display screen, at least a part of the plurality of objects, the method being performed on a computer system and comprising:
  detecting first input information from a first input device, at least one of the plurality of objects being selected based on the first input information;
  detecting second input information from a second input device;
  displaying, on the display screen, a specific menu suitable for editing the selected object in a case where an object of the at least one of the plurality of objects is selected to edit and the second input information requires displaying a menu;
  displaying, on the display screen, a general-purpose menu in a case where none of the plurality of objects is selected to edit and the second input information requires displaying a menu;
  performing an operation for an image displayed on the display screen, in a case where the second input information requires the operation, in a state that the general-purpose menu is displayed on the display screen, the operation including one of enlarging, reducing and panning of the image displayed on the display screen, then displaying a keypad in response to an event that at least one of the plurality of objects is selected based on the first input information after a deactivation of the second input information that requires the operation.

20. A non-transitory computer readable medium having a program stored thereon, that when executed allows a computer to function as the input information processing system according to claim 18.

* * * * *